(12) United States Patent
Matsunaga

(10) Patent No.: US 12,162,442 B2
(45) Date of Patent: Dec. 10, 2024

(54) VEHICULAR CLEANER

(71) Applicant: KOITO MANUFACTURING CO., LTD., Tokyo (JP)

(72) Inventor: Takahiro Matsunaga, Shizuoka (JP)

(73) Assignee: KOITO MANUFACTURING CO., LTD., Tokyo (JP)

( * ) Notice: Subject to any disclaimer, the term of this patent is extended or adjusted under 35 U.S.C. 154(b) by 501 days.

(21) Appl. No.: 17/427,282

(22) PCT Filed: Jan. 31, 2020

(86) PCT No.: PCT/JP2020/003769
§ 371 (c)(1),
(2) Date: Jul. 30, 2021

(87) PCT Pub. No.: WO2020/158937
PCT Pub. Date: Aug. 6, 2020

(65) Prior Publication Data
US 2022/0111822 A1    Apr. 14, 2022

(30) Foreign Application Priority Data

Feb. 1, 2019  (JP) ................................. 2019-017121
Feb. 1, 2019  (JP) ................................. 2019-017122
Feb. 1, 2019  (JP) ................................. 2019-017123

(51) Int. Cl.
*B08B 5/02*    (2006.01)
*B60S 1/54*    (2006.01)
(Continued)

(52) U.S. Cl.
CPC .................. *B60S 1/56* (2013.01); *B08B 5/02* (2013.01); *B60S 1/54* (2013.01); *B60R 11/04* (2013.01); *B60S 1/52* (2013.01)

(58) Field of Classification Search
CPC ...... B60S 1/56; B60S 1/54; B60S 1/52; B08B 5/02; B60R 11/04; F05D 2250/12;
(Continued)

(56) References Cited

U.S. PATENT DOCUMENTS

| 6,076,795 A | 6/2000 | Scheidel et al. |
| 2015/0183406 A1 | 7/2015 | Tanaka et al. |
| 2015/0203077 A1 | 7/2015 | Gokan |
| 2015/0343999 A1 | 12/2015 | Lopez Galera et al. |

(Continued)

FOREIGN PATENT DOCUMENTS

| CN | 203920685 U | 11/2014 |
| CN | 104470771 A | 3/2015 |

(Continued)

OTHER PUBLICATIONS

Supplementary Partial European Search Report issued in corresponding European Application No. 20749541.7; dated Feb. 24, 2022 (11 pages).

(Continued)

*Primary Examiner* — Erin F Bergner
(74) *Attorney, Agent, or Firm* — Osha Bergman Watanabe & Burton LLP

(57) ABSTRACT

This vehicular cleaner is provided with: an air blowing portion having an intake port through which air is taken in, the air being ejected to a cleaning object; and a filter which is provided at the air intake port, prevents foreign matter from entering the air blowing portion, and allows air to pass through the filter.

8 Claims, 24 Drawing Sheets

(51) Int. Cl.
*B60S 1/56* (2006.01)
*B60R 11/04* (2006.01)
*B60S 1/52* (2006.01)

(58) Field of Classification Search
CPC .............. F05D 2260/602; H04N 23/57; H04N 23/52; F04D 29/282; F04D 29/4226; F04D 29/703; G02B 27/0006; G03B 17/02; G03B 17/56; H02K 5/04; H02K 5/24; H02K 7/14
See application file for complete search history.

(56) References Cited

U.S. PATENT DOCUMENTS

| | | |
|---|---|---|
| 2017/0057467 A1 | 3/2017 | Tanaka |
| 2017/0313286 A1 | 11/2017 | Galera et al. |
| 2018/0194331 A1* | 7/2018 | Kubota ................. B60R 11/04 |
| 2018/0265049 A1 | 9/2018 | Schmidt et al. |
| 2019/0008345 A1 | 1/2019 | Schmidt et al. |
| 2019/0337490 A1 | 11/2019 | Kawamura et al. |
| 2020/0324738 A1 | 10/2020 | Kubota et al. |

FOREIGN PATENT DOCUMENTS

| | | | |
|---|---|---|---|
| CN | 205706426 U | 11/2016 | |
| CN | 106694425 A | 5/2017 | |
| DE | 102018115896 A1 | 1/2019 | |
| JP | 847042451 B1 | 10/1972 | |
| JP | H0231400 U | 2/1990 | |
| JP | H074899 U | 1/1995 | |
| JP | 2000509959 A | 8/2000 | |
| JP | 2001171491 A | 6/2001 | |
| JP | 2014019403 A | 2/2014 | |
| JP | 2014201150 A | 10/2014 | |
| WO | WO-2017002688 A1 * | 1/2017 | ........... B05B 9/0413 |
| WO | 2018043743 A1 | 3/2018 | |
| WO | WO-2018084427 A1 * | 5/2018 | ............... B60H 1/12 |
| WO | 2018123517 A1 | 7/2018 | |
| WO | 2018130610 A1 | 7/2018 | |

OTHER PUBLICATIONS

International Search Report issued in corresponding International Application No. PCT/JP2020/003769; mailed Apr. 7, 2020 (11 pages).

Written Opinion of the International Searching Authority issued in corresponding International Application No. PCT/JP2020/003769; dated Apr. 7, 2020.

Office Action Issued in Corresponding CN Application No. 202080009869.6, dated Mar. 27, 2024 (16 Pages with English Translation).

* cited by examiner

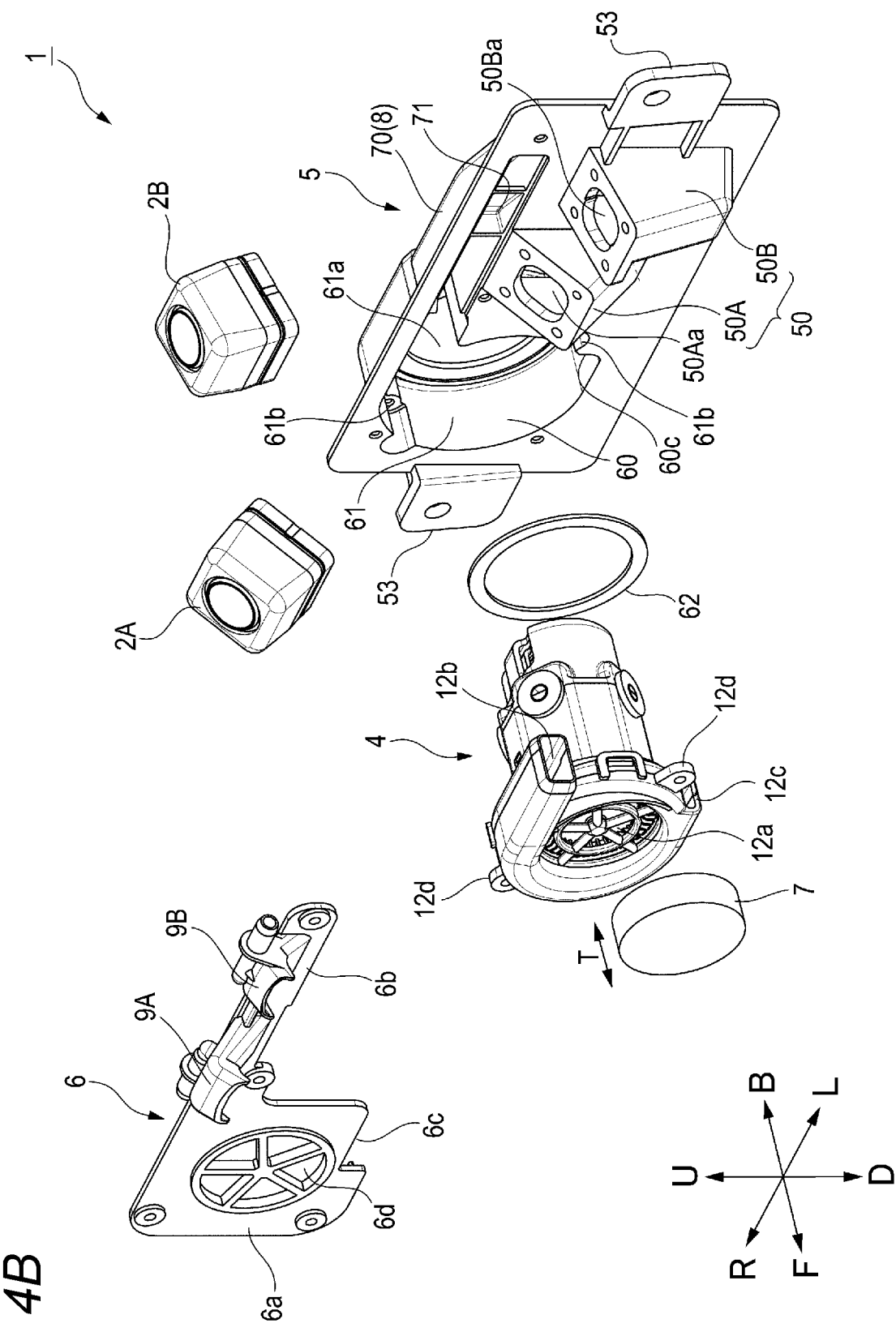

VEHICULAR CLEANER

TECHNICAL FIELD

The present disclosure relates to a vehicular cleaner.

BACKGROUND ART

In recent years, a vehicle equipped with an in-vehicle camera which captures images of a situation around the vehicle increases. A lens, which serves as an imaging surface, of the in-vehicle camera may be contaminated by rain, mud, or the like. In order to remove foreign matter such as water drops adhering to the lens, a device which blows a cleaning liquid, compressed air, or the like to the lens of the in-vehicle camera to remove the foreign matter is known (see Patent Literature 1).

In a foreign matter removal device in Patent Literature 1, a compressed air generation unit is located in the vicinity of an in-vehicle camera, and compressed air in the compressed air generation unit is ejected from a nozzle to blow high-pressure air to a lens of the in-vehicle camera, thereby removing water drops adhering to the lens.

CITATION LIST

Patent Literature

Patent Literature 1: JP-A-2001-171491

SUMMARY OF INVENTION

Technical Problem

An air blowing portion such as the compressed air generation unit takes in outside air from an intake port. Therefore, when the air is taken in, foreign matter may enter an inner side of the air blowing portion from the intake port.

The air blowing portion includes a driving portion which drives an air blowing body. A vibration of the driving portion may be transmitted to the air blowing portion body, and may affect an operation of the air blowing portion body. A vibration sound may be generated due to the vibration of the drive unit.

When a cleaning liquid is ejected from the nozzle, the cleaning liquid may remain at a tip end of the nozzle, and water drops of the cleaning liquid may be reflected on the in-vehicle camera. In addition, an ejection port of the nozzle may be blocked when foreign matter (such as mud and dust) or water drops such as rain adhered to the ejection port of the nozzle are frozen at the ejection port of the nozzle.

An object of the present disclosure is to provide a vehicular cleaner which prevents foreign matter from entering an inner side of an air blowing portion.

An object of the present disclosure is to provide a vehicular cleaner which prevents a vibration of a driving portion from being transmitted to an air blowing portion body.

An object of the present disclosure is to provide a vehicular cleaner which can remove water drops and a foreign matter adhering to a tip end or an ejection port of a nozzle.

Solution to Problem

A vehicular cleaner according to an aspect of the present disclosure includes an air blowing portion having an intake port through which air is taken in, the air being ejected to a cleaning object, and a filter which is provided at the intake port, prevents foreign matter from entering the air blowing portion, and allows air to pass through the filter.

According to the above configuration, since the filter is provided at the intake port of the air blowing portion, it is possible to prevent foreign matter from entering an inner side of the air blowing portion. For example, when air is taken in, foreign matter such as dust can be prevented from entering the inner side of the air blowing portion.

The filter may be detachably provided on the intake port of the air blowing portion.

According to the above configuration, the filter can be replaced with a new filter when the filter is deteriorated.

The intake port of the air blowing portion may take in air outside a vehicle.

When the intake port takes in air outside the vehicle, a large amount of foreign matters are likely to enter the inner side of the air blowing portion. According to the above configuration, the foreign matters can be prevented from entering the inner side of the air blowing portion.

The air blowing portion may be a non-displacement type air blowing portion which continuously takes in air.

Since the non-displacement type air blowing portion continuously takes in air, a larger amount of foreign matters are likely to enter an inner side of the non-displacement type air blowing portion. According to the above configuration, the foreign matters can be prevented from entering the inner side of the non-displacement type air blowing portion.

The vehicular cleaner may include a bracket which accommodates the air blowing portion, and the bracket may have a drain hole discharging water which enters the air blowing portion from the intake port of the air blowing portion.

According to the above configuration, water entered the air blowing portion from the intake port of the air blowing portion can be discharged to the outside.

A heating unit may be provided around the intake port of the air blowing portion.

According to the above configuration, snow can be prevented from adhering to the air intake port or a periphery of the air intake port when it snows or when snow accumulated on a road surface is rolled up. In addition, water drops adhered to the air intake port or the periphery of the air intake port can be prevented from freezing.

A vehicular cleaner according to an aspect of the present disclosure includes an air blowing portion including: an air blowing portion body which sends air to be ejected to a cleaning object; a supporting portion which supports at least the air blowing portion body; and a driving portion which drives the air blowing portion body, and the vehicular cleaner includes a vibration-proof portion which prevents a vibration of the driving portion from being transmitted to the supporting portion.

According to the above configuration, the vibration of the driving portion is prevented from being transmitted to the supporting portion by the vibration-proof portion. Therefore, the vibration of the driving portion can be prevented from being transmitted to the air blowing portion body via the supporting portion. In addition, generation of a vibration sound due to the vibration of the driving portion can be prevented.

The vibration-proof portion may include an elastic member which absorbs the vibration of the driving portion and an attachment portion which attaches the elastic member to the driving portion, and the supporting portion may be attached to the elastic member so as not to be in contact with the driving portion.

According to the above configuration, since the vibration of the driving portion is absorbed by the elastic member, the vibration of the driving portion can be prevented from being transmitted to the supporting portion. Since the supporting portion is not in contact with the driving portion, the vibration of the driving portion can be prevented from being transmitted to the supporting portion.

The attachment portion may have a bar shape, and the elastic member may have a tubular shape having a through hole. A groove recessed in a direction orthogonal to an axial direction of the through hole may be formed in a side surface of the elastic member. The attachment portion may be inserted into the through hole, and a part of the supporting portion may be inserted into the groove.

According to the above configuration, the elastic member can be easily attached to the driving portion by inserting the attachment portion into the through hole of the elastic member. In addition, the supporting portion is attached to the elastic member by inserting a part of the supporting portion into the groove formed in the side surface of the elastic member. When the elastic member is increased in size in order to improve a vibration prevention effect, the elastic member may be increased in size in a direction orthogonal to the axial direction of the through hole rather than in the axial direction of the through hole. Therefore, the vibration prevention effect can be improved without enlarging the entire supporting portion and/or the air blowing portion.

The vibration-proof portion may further include a cage portion which surrounds the driving portion in a state where the vibration-proof portion is in contact with the driving portion, and the attachment portion may be integrally molded with the cage portion.

According to the above configuration, the attachment portion can be stably attached to the drive unit by the cage portion. The vibration of the driving portion can be transmitted to the elastic member via the cage portion and the attachment portion, and the vibration can be absorbed by the elastic member.

The vibration-proof portion may include at least three attachment portions arranged around the driving portion, and at least three elastic members attached to the driving portion via the three attachment portions.

According to the above configuration, at least three attachment portions are disposed around the driving portion. For example, when only two attachment portions are arranged around the driving portion, the driving portion may rotate relative to the supporting portion about the axial direction of the attachment portion. On the other hand, when three attachment portions are arranged around the drive unit, the drive unit can be prevented from rotating relative to the supporting portion about the axial direction of the attachment portion.

The vibration-proof portion may include a cage portion which supports the driving portion and is connected to the supporting portion, and the cage portion may include a leaf spring portion which absorbs the vibration of the driving portion.

According to the above configuration, since the vibration of the driving portion is absorbed by the leaf spring portion, the vibration of the driving portion can be prevented from being transmitted to the supporting portion while the driving portion is supported by the cage portion.

The cage portion may include a flange portion which is in contact with the supporting portion, and the leaf spring portion may extend from the flange portion along the driving portion in a state where the leaf spring portion is not in contact with the driving portion, and a tip end portion of the leaf spring portion may be in contact with the driving portion.

According to the above configuration, since the leaf spring portion absorbs the vibration of the driving portion transmitted from the tip end portion of the leaf spring portion, the vibration can be prevented from being transmitted to the flange portion.

The cage portion may include a rotation prevention portion which is locked to the supporting portion and prevents a rotation of the cage portion relative to the supporting portion.

According to the above configuration, rotation of the cage portion relative to the supporting portion due to the vibration of the driving portion can be prevented by the rotation prevention portion.

A vehicular cleaner according to an aspect of the present disclosure includes a nozzle including a cleaning liquid ejection port which ejects a cleaning liquid toward a cleaning surface of a cleaning object and two air ejection ports which eject air toward the cleaning surface of the cleaning object, and the two air ejection ports are arranged on both sides of the cleaning liquid ejection port.

According to the above configuration, water drops or foreign matters adhering to a tip end of the nozzle or an ejection port can be removed by the air ejected from the air ejection ports. For example, water drops or foreign matters adhering to a tip end of the nozzle or the cleaning liquid ejection port can be removed by the air ejected from the air ejection ports. Examples of the water drops include remaining cleaning liquid or water drops such as rain water. Since the air ejection ports and the cleaning liquid ejection port are formed at one nozzle, an appearance of the vehicular cleaner is improved as compared with a case where the vehicular cleaner is provided with a plurality of nozzles.

The two air ejection ports may be arranged on both sides of the cleaning liquid ejection port in a first direction, and a width of each of the air ejection ports in a second direction perpendicular to the first direction may be larger than a width of the cleaning liquid ejection port in the second direction.

According to the above configuration, since each of the air ejection ports has a large width in the second direction, air can be ejected without interfering with an air flow. On the other hand, since the cleaning liquid ejection port has a small width in the second direction, the cleaning liquid can be ejected while being widely diffused.

The two air ejection ports may be arranged on both sides of the cleaning liquid ejection port in the first direction, and a width of each of the air ejection ports in the first direction may be larger than a width of the cleaning liquid ejection port in the first direction.

According to the above configuration, since each of the air ejection ports has a large width in the first direction, air can be ejected without interfering with an air flow. On the other hand, since the cleaning liquid ejection port has a small width in the first direction, the cleaning liquid can be ejected while being widely diffused.

An area of a surface of each of the air ejection ports orthogonal to an ejection direction of the air may be larger than an area of a surface of the cleaning liquid ejection port perpendicular to an ejection direction of the cleaning liquid.

According to the above configuration, since each of the air ejection ports has a large area, air can be ejected without interfering with an air flow. On the other hand, since the cleaning liquid ejection port has a small area, the cleaning liquid can be ejected while being widely diffused.

Advantageous Effects of Invention

According to the present disclosure, it is possible to provide a vehicular cleaner which prevents foreign matter from entering an inner side of an air blowing portion.

It is possible to provide a vehicular cleaner which prevents a vibration of the driving portion from being transmitted to an air blowing portion body.

It is possible to provide a vehicular cleaner which can remove water drops and foreign matter adhering to a tip end of a nozzle or an ejection port.

BRIEF DESCRIPTION OF DRAWINGS

FIG. 4B is an exploded perspective view of the vehicular cleaner unit.

DESCRIPTION OF EMBODIMENTS

Figure 1:
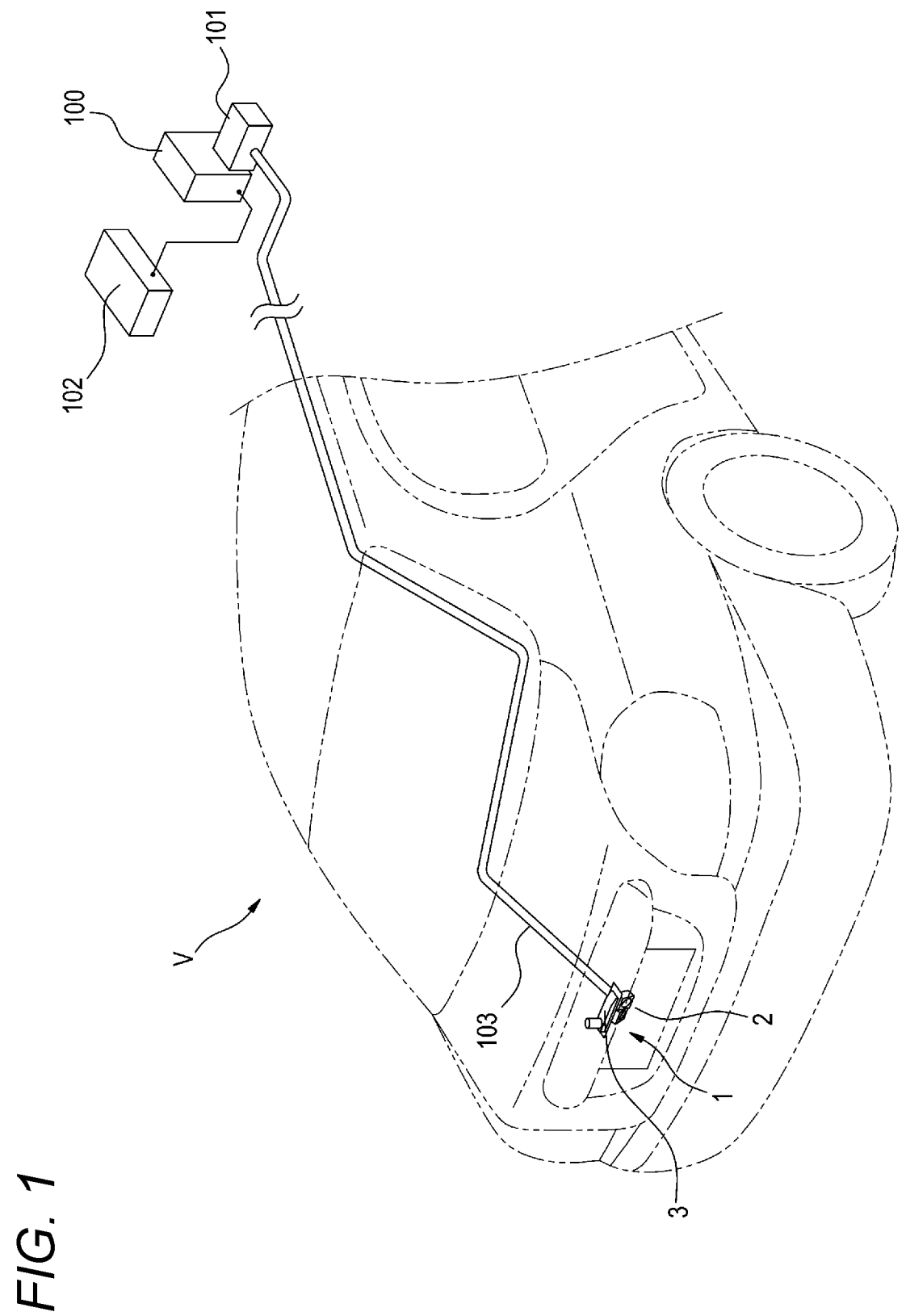
FIG. 1 is a schematic diagram illustrating a vehicle equipped with a vehicular cleaner unit of a first embodiment of the present disclosure.

Hereinafter, embodiments of the present disclosure will be described with reference to the drawings. Dimensions of members illustrated in the drawings may be different from actual dimensions of the respective members for convenience of description.

In the description of the present embodiment, a "left-right direction", an "up-down direction", and a "front-rear direction" will be appropriately referred to for convenience of description. Such directions are relative directions set for vehicular cleaner units 1 and 201 illustrated in FIGS. 4A and 16. A side of the vehicular cleaner unit 1 on which a bracket cover 6 is provided is referred to as a front side, and an opposite side thereof is referred to as a rear side. In the drawings, "U" refers to an upper side, "D" refers to a lower side, "F" refers to a front side, "B" refers to a rear side, "R" refers to a right side, and "L" refers to a left side.

First Embodiment

Figure 2:
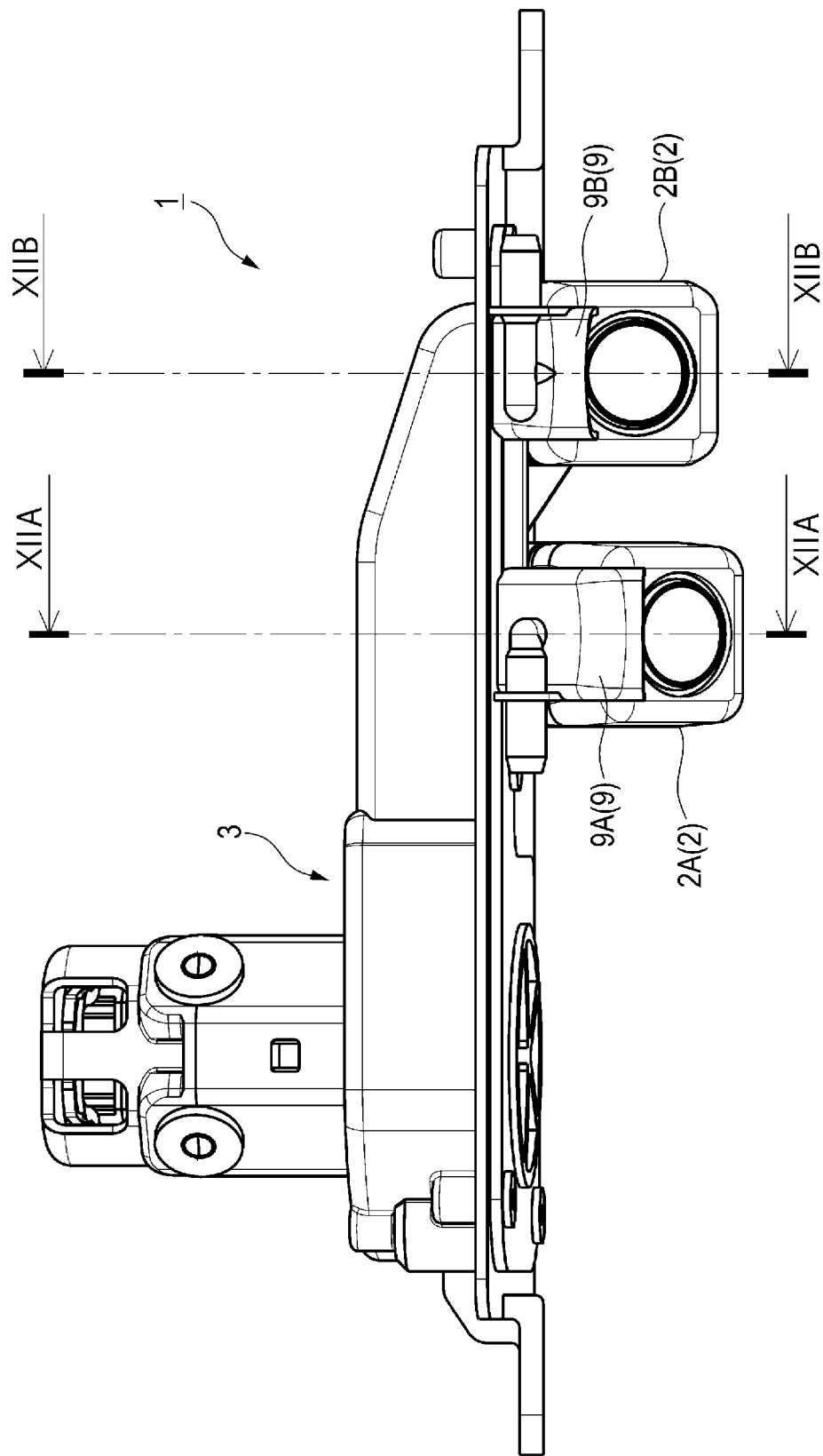
FIG. 2 illustrates the vehicular cleaner unit of FIG. 1 as viewed from a vehicle rear side.
Figure 3:
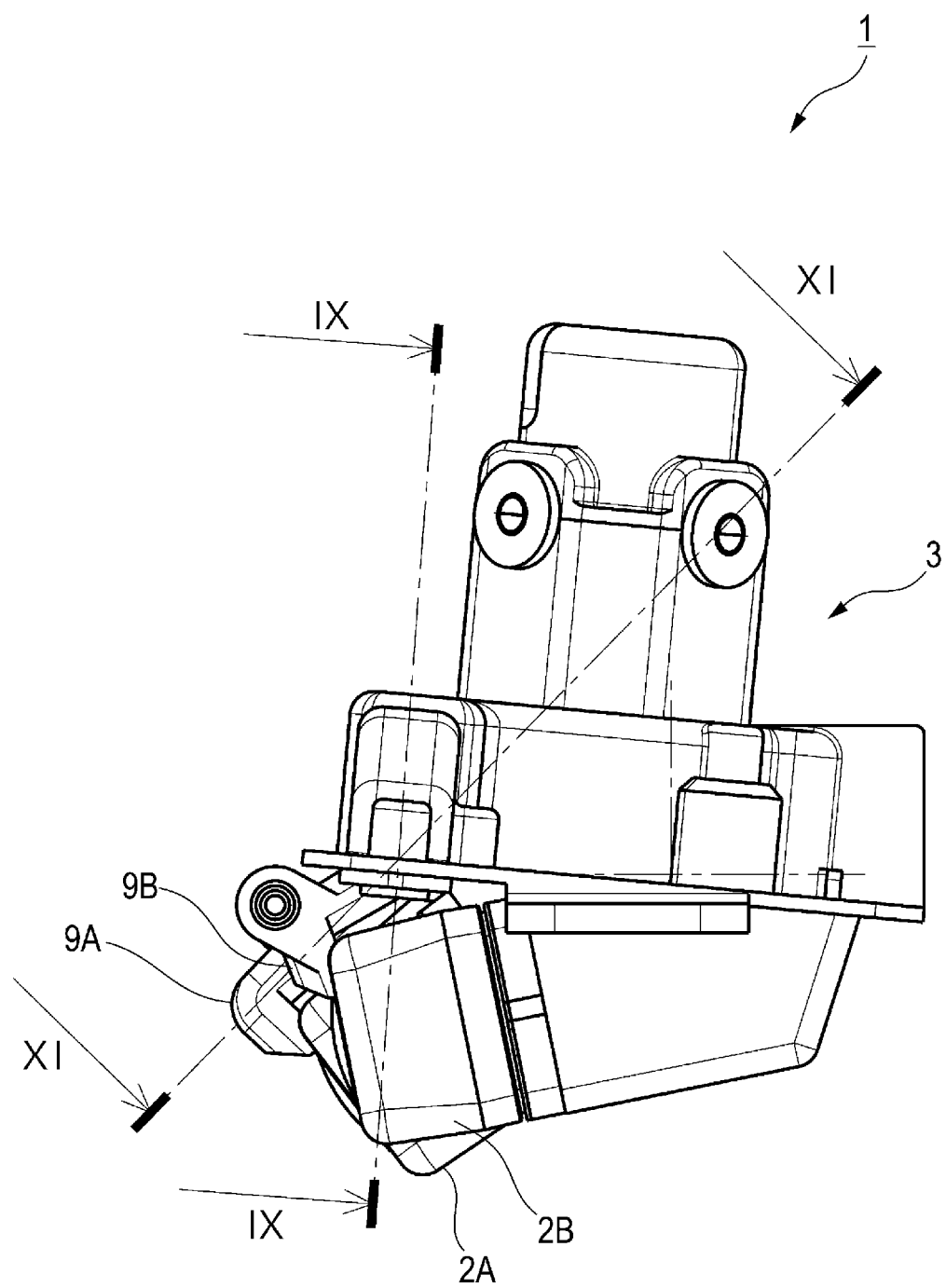
FIG. 3 illustrates the vehicular cleaner unit of FIG. 1 as viewed from a vehicle lateral side.
Figure 4A:
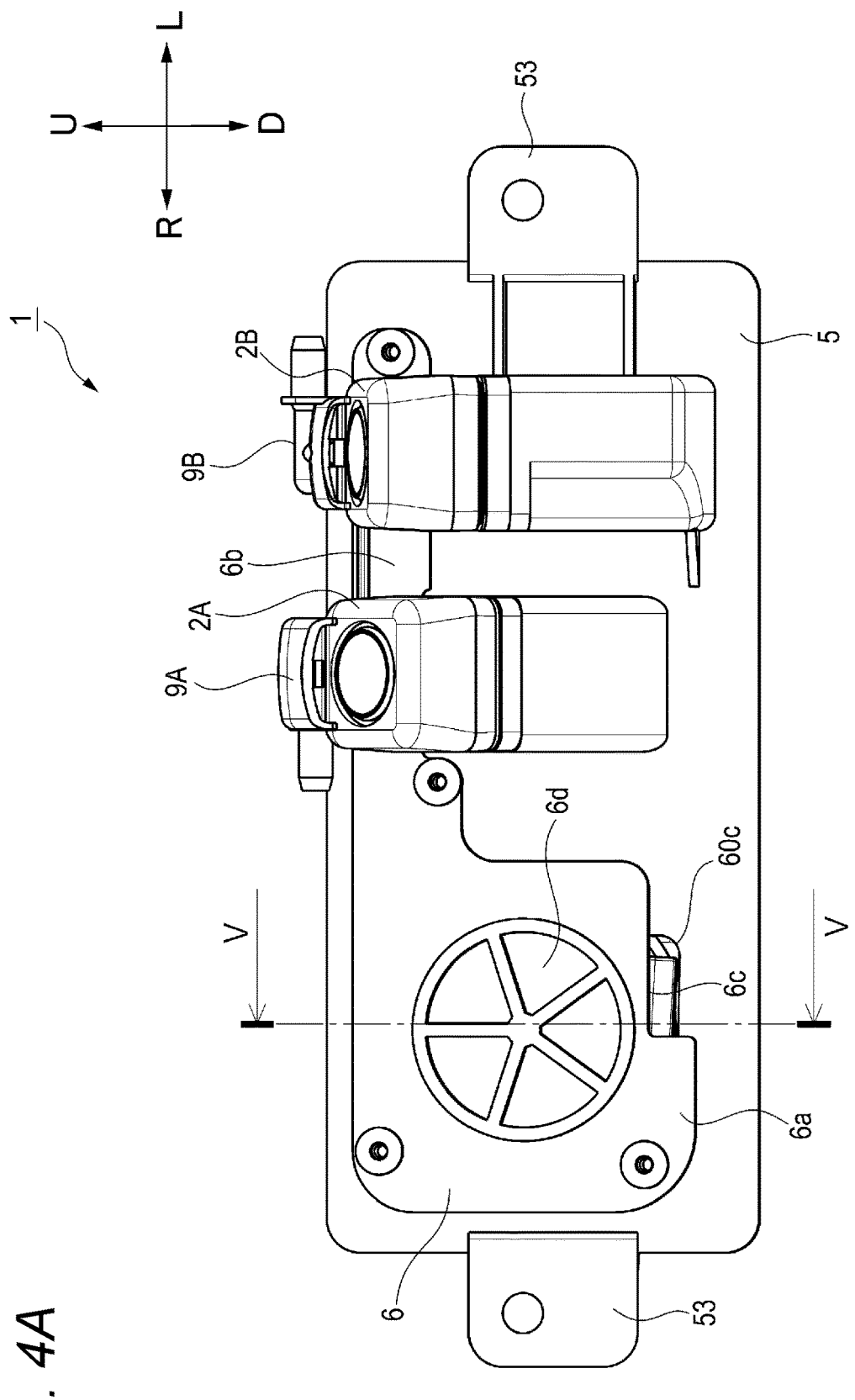
FIG. 4A is a front view of the vehicular cleaner unit.
Figure 5:
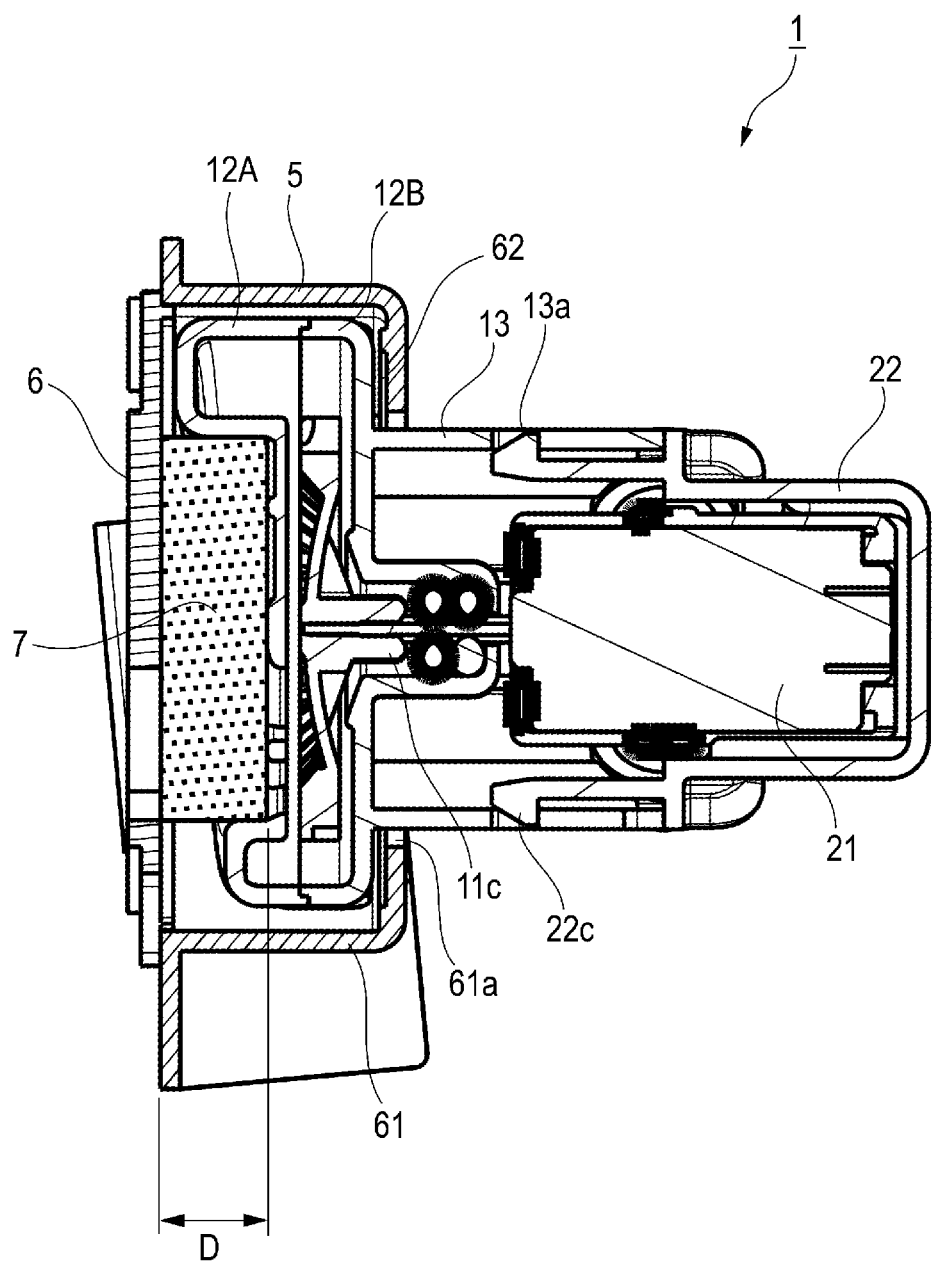
FIG. 5 is a cross-sectional view of the vehicular cleaner unit taken along line V-V of FIG. 4A.

Hereinafter, the vehicular cleaner unit 1 which includes a vehicular cleaner 3 according to a first embodiment will be described. FIG. 1 is a schematic view illustrating a vehicle V equipped with the vehicular cleaner unit 1 of the first embodiment. FIG. 2 illustrates the vehicular cleaner unit 1 of FIG. 1 as viewed from the rear side of the vehicle V. FIG. 3 illustrates the vehicular cleaner unit 1 of FIG. 1 as viewed from a lateral side of the vehicle V. FIG. 4A is a front view of the vehicular cleaner unit 1. FIG. 4B is an exploded perspective view of the vehicular cleaner unit 1. FIG. 5 is a cross-sectional view of the vehicular cleaner unit 1 taken along line V-V of FIG. 4A.

As illustrated in FIG. 1, the vehicle V includes the vehicular cleaner unit 1, a tank 100, a motor pump 101, and a vehicle electronic control unit (ECU) 102.

Vehicular Cleaner Unit 1

The vehicular cleaner unit 1 includes an in-vehicle camera 2, which is a cleaning object, and the vehicular cleaner 3. The vehicular cleaner unit 1 cleans foreign matter adhering to the in-vehicle camera 2 (water droplets, mud, dust, and the like) by the vehicular cleaner 3 through using a cleaning liquid and/or air. For example, the vehicular cleaner 3 takes in air from outside and blows the taken air to the in-vehicle camera 2. The vehicular cleaner 3 blows the cleaning liquid from the tank 100 to the in-vehicle camera 2 at predetermined timing based on control of the vehicle ECU 102.

The vehicular cleaner unit 1 is mounted on a rear portion of the vehicle V. For example, the vehicular cleaner unit 1 is attached to an outer panel of the rear portion of the vehicle V from the outside, and is covered from the upper side by a garnish.

The tank 100 stores the cleaning liquid to be ejected from the vehicular cleaner unit 1. The motor pump 101 pumps the cleaning liquid stored in the tank 100 to the vehicular cleaner unit 1 based on a control signal from the vehicle ECU 102. The tank 100 and the motor pump 101 are arranged, for example, in a bonnet of the vehicle V. The motor pump 101 is connected to the vehicular cleaner unit 1 via a connecting hose 103. The tank 100 and the motor pump 101 may also be arranged on the rear side of the vehicle V. The tank 100 and the motor pump 101 may also serve as a cleaning liquid tank and a motor pump of a window washer device (not illustrated) configured to eject the cleaning liquid so as to clean a front window and a rear window.

The vehicle ECU 102 controls the vehicle V. The vehicle ECU 102 controls the motor pump 101 such that the cleaning liquid in the tank 100 is ejected from a nozzle 9 of the vehicular cleaner unit 1 illustrated in FIG. 2 toward the in-vehicle camera 2 which serves as the cleaning object.

In-Vehicle Camera 2

As illustrated in FIG. 2, the in-vehicle camera 2 includes a back camera 2A and a rear camera 2B. The back camera 2A acquires an image of the vicinity of the host vehicle V behind the vehicle V when the vehicle V is moved backward. For example, information which is output from the back camera 2A so as to confirm presence of an obstacle near the host vehicle V when the vehicle V is parked can be used.

The rear camera 2B constantly acquires an image of the rear side of the vehicle V. The rear camera 2B is, for example, an inner mirror camera. The inner mirror camera refers to a camera configured to photograph a situation (video) of the rear side which can be confirmed by an inner mirror (back mirror). The inner mirror camera operates at least while the engine of the vehicle V is on. For example, information output from the rear camera 2B so as to confirm presence or absence of another vehicle which is going to overtake the host vehicle V from behind can be used.

As illustrated in FIGS. 2 and 3, the vehicular cleaner unit 1 is attached to the vehicle V such that the back camera 2A faces obliquely rearward and downward of the vehicle V while the rear camera 2B faces straight rearward of the vehicle V.

Vehicular Cleaner 3

The vehicular cleaner 3 cleans foreign matter adhering to the back camera 2A and the rear camera 2B by ejecting cleaning liquid and/or air. As illustrated in FIGS. 4A to 5, the vehicular cleaner 3 includes a multi-blade fan 4, a bracket 5, a bracket cover 6, and a filter 7. The vehicular cleaner 3 also includes an air guide tube 8 and the nozzle 9. The multi-blade fan 4 is an example of an air blowing portion and a non-displacement type air blowing portion. The bracket 5 and the bracket cover 6 are an example of a bracket.

Multi-blade Fan 4

Figure 6:
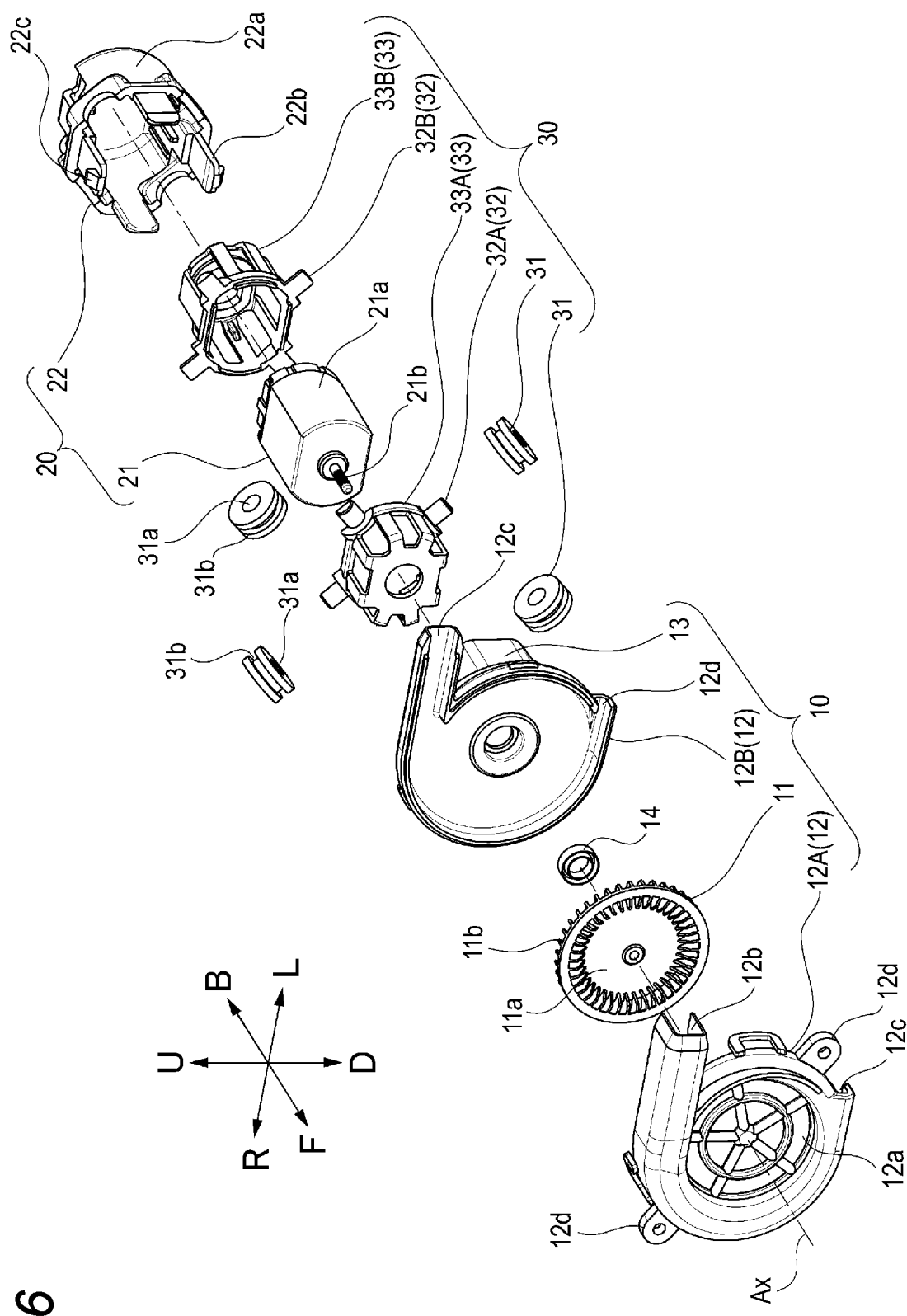
FIG. 6 is an exploded perspective view of a multi-blade fan.
Figure 7:
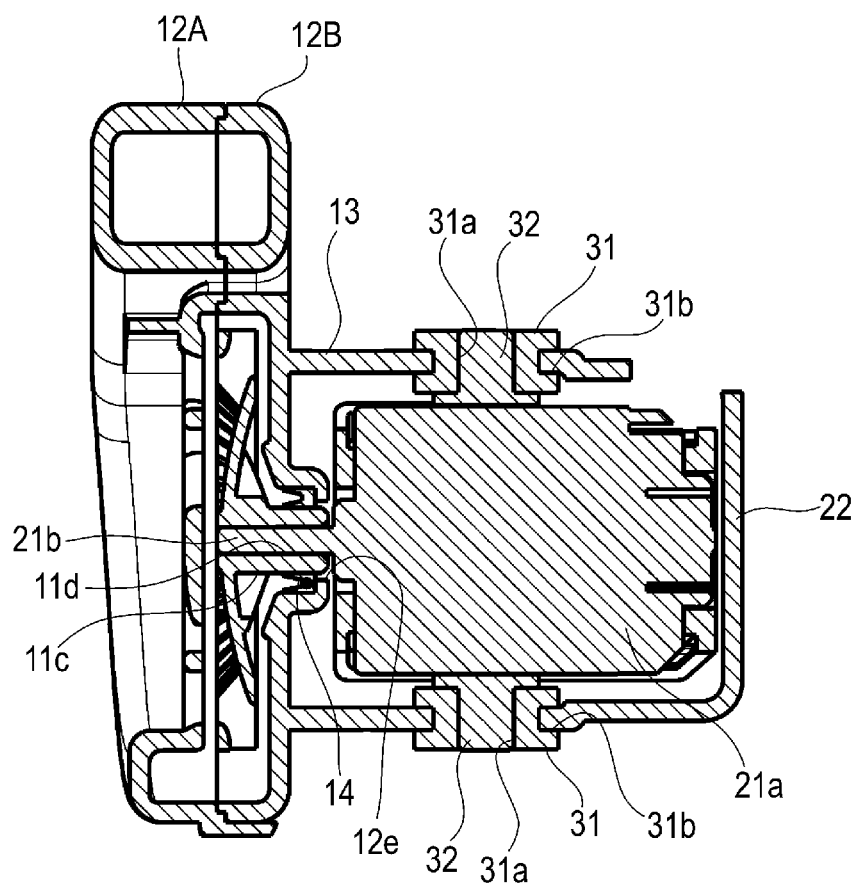
FIG. 7 is an axial direction cross-sectional view of the multi-blade fan.
Figure 8:
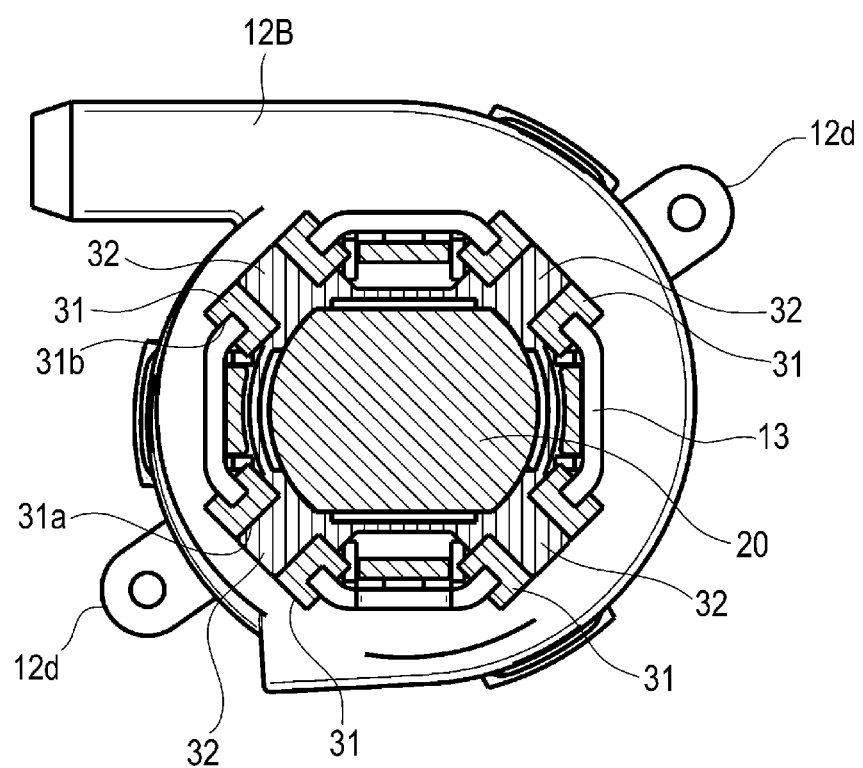
FIG. 8 is a radial direction cross-sectional view of the multi-blade fan.

First, the multi-blade fan 4 will be described mainly with reference to FIGS. 6 to 8. FIG. 6 is an exploded perspective view of the multi-blade fan 4. FIG. 7 is an axial direction cross-sectional view of the multi-blade fan 4. FIG. 8 is a radial direction cross-sectional view of the multi-blade fan 4. In the following description, for convenience, a side of the multi-blade fan 4, on which an impeller 11 of a multi-blade fan body portion 10 is provided, is referred to as a front side, and a side opposite thereto is referred to as a rear side.

The multi-blade fan 4 is configured to continuously take in air from the outside and continuously send out the taken air. As illustrated in FIG. 6, the multi-blade fan 4 includes the multi-blade fan body portion 10, a driving portion 20, and a vibration-proof portion 30. The multi-blade fan body portion 10 is an example of an air blowing portion body.

The multi-blade fan body portion 10 is configured to take in air to be ejected to the in-vehicle camera 2 and send out the taken air. The multi-blade fan body portion 10 includes the impeller 11, a housing 12, and a support portion 13.

The impeller 11 is capable of being rotated around a rotation axis Ax by the driving portion 20. The impeller 11 includes a disk-shaped main plate 11a and a plurality of blades 11b. The plurality of blades 11b are formed to extend in a radial direction. The plurality of blades 11b are attached to the main plate 11a so as to form an annular shape. As illustrated in FIG. 7, the main plate 11a includes a cylindrical shaft portion 11c which extends from a rear surface along the rotation axis Ax. The shaft portion 11c includes a rotation shaft hole 11d into which a rotation shaft 21b of a motor 21 of the driving portion 20 is inserted. When the motor 21 is driven, the shaft portion 11c of the main plate 11a is also rotated together with rotation of the rotation shaft 21b of the motor 21, and the impeller 11 is rotated around the rotation axis Ax.

The housing 12 has a substantially doughnut-shaped internal space therein, and the impeller 11 is accommodated in the internal space. The housing 12 includes an air intake port 12a, an air outlet 12b, and a drain port 12c (see FIG. 4B). The air intake port 12a is an opening through which air is taken in from the outside. The air outlet 12b is an opening through which the air taken in from the air intake port 12a is sent out. The drain port 12c is an opening through which water which has entered the multi-blade fan 4 is discharged. The air intake port 12a is opened on an extension line of the rotation axis Ax of the impeller 11. The air outlet 12b is opened in a direction intersecting the rotation axis Ax of the impeller 11. The drain port 12c is opened in the direction intersecting the rotation axis Ax of the impeller 11. The drain port 12c allows the internal space of the housing 12 to communicate with the outside. The drain port 12c is opened in a bottom portion of the housing 12 in a state where the vehicular cleaner 3 is attached to the vehicle V. The water which has entered the inside of the housing 12 passes through the drain port 12c and falls to the outside, so that the water does not drip inside the housing 12.

The housing 12 includes a front housing 12A and a rear housing 12B which are divided into two parts with the impeller 11 interposed therebetween. The front housing 12A includes bracket attachment portions 12d at two positions face each other on a side surface thereof. The multi-blade fan 4 is fixed to the bracket 5 via each bracket attachment portion 12d. As illustrated in FIG. 7, the rear housing 12B includes, in a center thereof, an opening 12e into which the shaft portion 11c of the main plate 11a of the impeller 11 is inserted. A seal member 14 is arranged between the opening 12e of the rear housing 12B and the shaft portion 11c of the main plate 11a of the impeller 11. The seal member 14 allows the impeller 11 to rotate around the rotation axis Ax while preventing water or the like from entering the driving portion 20 from the housing 12.

When the impeller 11 is rotated, the air suctioned from the air intake port 12a is pressed against an inner peripheral surface of the rear housing 12B by the blades 11b. The pressed air is guided along the inner peripheral surface of the rear housing 12B so as to be guided to the air outlet 12b, and is sent from the air outlet 12b toward an air guide tube forming portion 70 of the bracket 5. That is, the air suctioned from the direction of the rotation axis Ax of the impeller 11 is pushed out in the radial direction by the rotating blades 11b and pressed against the inner peripheral surface of the rear housing 12B, and is thus sent out from the air outlet opened in the radial direction toward the air guide tube forming portion 70 of the bracket 5.

As illustrated in FIG. 7, the support portion 13 supports the housing 12. The support portion 13 is connected to the motor 21 of the driving portion 20 via the vibration-proof portion 30. The support portion 13 accommodates a front portion of the motor 21 of the driving portion 20 therein. In the present embodiment, the support portion 13 is integrally molded with the housing 12. The support portion 13 extends rearward from a rear surface of the rear housing 12B along the rotation axis Ax, and has a tubular shape whose cross section is octagonal (see FIG. 8). The support portion 13 includes an engagement hole 13a (see FIG. 5). An engagement claw 22c of a motor case 22 of the driving portion 20 is engaged with the engagement hole 13a, and thus the support portion 13 is connected to the motor case 22 of the driving portion 20.

The support portion 13 is integrally molded with the housing 12. However, for example, the support portion 13 may also be formed separately from the housing 12, and may be integrated with the housing 12 by being assembled to or bonded to the housing 12. The support portion 13 has the octagonal cross section. However, for example, the cross section of the support portion 13 may also be a circle, an ellipse, or a polygon other than the octagon.

The driving portion 20 is configured to drive the multi-blade fan body portion 10. The driving portion 20 includes the motor 21 and the motor case 22.

The motor 21 rotates the impeller 11 around the rotation axis Ax. The motor 21 includes a motor body portion 21a and the rotation shaft 21b. The motor body portion 21a has a substantially prismatic shape. The rotation shaft 21b extends forward from a front surface of the motor body portion 21a along the rotation axis Ax. The rotation shaft 21b is inserted into the rotation shaft hole 11d of the shaft portion 11c of the main plate 11a.

The motor case 22 accommodates and supports the motor 21. The motor case 22 includes a motor accommodating portion 22a and a support portion attachment portion 22b. The motor accommodating portion 22a accommodates a rear portion of the motor 21. The support portion attachment portion 22b extends forward from a front end of the motor accommodating portion 22a. The motor case 22 is connected to the support portion 13 by engaging the engagement claw 22c at a tip end portion thereof with the engagement hole 13a (see FIG. 5) of the support portion 13.

The support portion 13 includes the engagement hole 13a, while the motor case 22 includes the engagement claw 22c. However, the support portion 13 may include the engagement claw, while the motor case 22 may include the engagement hole.

The vibration-proof portion 30 is configured to prevent vibration of the driving portion 20 from being transmitted to the support unit 13. The vibration-proof portion 30 includes a plurality of elastic members 31, a plurality of elastic member attachment portions 32 (hereinafter referred to as attachment portions 32), and a cage portion 33.

Each elastic member 31 absorbs vibration of the motor 21 and prevents the vibration of the motor 21 from being transmitted to the support portion 13. The elastic member 31 is, for example, tubular vibration-proof rubber which includes a through hole 31a. Each attachment portion 32 is provided to be in contact with the motor 21. The elastic member 31 is attached to the motor 21 via the attachment portion 32. The attachment portion 32 has, for example, a bar shape which can be inserted into the through hole 31a of the elastic member 31. As illustrated in FIGS. 7 and 8, the elastic member 31 is provided to be in contact with the attachment portion 32 and the support portion 13. The support portion 13 is attached to the elastic member 31 so as not to be in contact with the motor 21. As illustrated in FIG. 6, the cage portion 33 is formed to surround the motor 21 in a state where the cage portion 33 is in contact with the motor 21. In the present embodiment, the cage portion 33 includes a front cage portion 33A and a rear cage portion 33B which are divided with the motor 21 interposed therebetween. The attachment portion 32 is integrally molded with the cage portion 33, and includes a front attachment portion 32A and a rear attachment portion 32B.

The attachment portions 32 are arranged at four positions around the motor 21 and extend in a radial direction of the motor 21. Each attachment portion 32 is attached into the through hole 31a of the elastic member 31 and thus the elastic member 31 is attached to the attachment portion 32. A groove 31b, which is recessed in a direction orthogonal to an axial direction of the through hole 31a, is formed over an entire periphery of a side surface of the elastic member 31. A part of the support portion 13 is inserted into the groove 31b of the elastic member 31, and thus the support portion 13 is attached to the motor 21 via the elastic member 31. The vibration of the motor 21 transmitted to the elastic member 31 via the cage portion 33 and the attachment portion 32 is absorbed by the elastic member 31.

A part of the motor case 22 is inserted into the groove 31b of the elastic member 31, and thus the motor case 22 is connected to the support portion 13 via the elastic member 31. The vibration of the motor 21 transmitted to the elastic member 31 via the motor case 22 is absorbed by the elastic member 31.

The attachment portion 32 is integrally molded with the cage portion 33. However, the attachment portion 32 may also be formed separately from the cage portion 33, and may be integrated with the cage portion 33 by being assembled or bonded thereto.

The attachment portions 32 and the elastic members 31 are arranged at four positions around the motor 21. The number and arrangement of the attachment portions 32 and the elastic members 31 are not limited to such four-position arrangement. For example, when the attachment portions 32 and the elastic members 31 are arranged at three positions around the motor 21, the motor 21 can be prevented from being rotated about an axial direction of the attachment portions 32 relative to the support portion 13.

The cage portion 33 is formed to surround an entire periphery of the motor 21. However, for example, the cage portion 33 may also be formed to surround a part of the motor 21.

The groove 31b of the elastic member 31 is formed over the entire periphery of the side surface of the elastic member 31. However, for example, the groove 31b may also be formed in a part of the side surface of the elastic member 31.

Shapes of the attachment portion 32 and the elastic member 31 are not limited to those of the present embodiment. The shapes of the attachment portion 32 and the elastic member 31 may be other shapes as long as such shapes can absorb the vibration of the motor 21 and prevent the vibration of the motor 21 from being transmitted to the support portion 13. In the case where the elastic member 31 has the tubular shape, the elastic member 31 is increased in size in the direction orthogonal to the axial direction of the through hole 31a rather than in the axial direction of the through hole 31a, so that the vibration of the motor 21 can be further absorbed.

As described above, in the present embodiment, the vibration of the motor 21 is prevented from being transmitted to the support portion 13 by the vibration-proof portion 30. Therefore, the vibration of the motor 21 can be prevented from being transmitted to the multi-blade fan body portion 10 of the multi-blade fan 4 via the support portion 13. Generation of vibration noise caused by the vibration of the motor 21 can also be prevented.

The elastic member 31 of the vibration-proof portion 30 is attached to the motor 21 via the attachment portion 32. The support portion 13 is attached to the elastic member 31 so as not to be in contact with the motor 21. Therefore, the vibration of the motor 21 is absorbed by the elastic member 31, and the vibration of the motor 21 can be prevented from being transmitted to the support portion 13. Moreover, since the support portion 13 is not in contact with the motor 21, the vibration of the motor 21 can be prevented from being transmitted to the support portion 13.

The bar-shaped attachment portion 32 is inserted into the through hole 31a of the elastic member 31, and thus the elastic member 31 is attached to the attachment portion 32. A part of the support portion 13 is inserted into the groove 31b formed in the side surface of the elastic member 31, and thus the support portion 13 is attached to the elastic member 31. When the elastic member 31 is increased in size to improve a vibration-proof effect thereof, the elastic member 31 can be increased in size in the direction orthogonal to the axial direction of the through hole 31a rather than in the axial direction of the through hole 31a. Therefore, the vibration-proof effect can be improved without enlarging the entire support portion 13 and/or the multi-blade fan 4.

The cage portion 33 surrounds the motor 21 in a state where the cage portion 33 is in contact with the motor 21. The cage portion 33 allows the attachment portion 32 to be stably attached to the motor 21. The vibration of the motor 21 can be transmitted to the elastic member 31 via the cage portion 33 and the attachment portion 32, and the vibration can be absorbed by the elastic member 31.

The attachment portions 32 and the elastic members 31 are preferably arranged at least three positions around the motor 21. For example, when the attachment portions 32 are arranged at only two positions around the motor 21, the motor 21 may rotate about the axial direction of the attachment portions 32 relative to the support portion 13. On the other hand, by arranging the attachment portions 32 at least at three positions around the motor 21, the motor 21 can be prevented from being rotated about the axial direction of the attachment portions 32 relative to the support portion 13.

A part of the motor case 22 is attached to the elastic member 31. Since the vibration of the motor 21 transmitted to the elastic member 31 via the motor case 22 is absorbed by the elastic member 31, the vibration of the motor 21 can be prevented from being transmitted to the support portion 13.

Bracket 5

Next, the bracket 5 will be described mainly with reference to FIGS. 4A, 4B, and 5.

The bracket 5 supports and fixes the back camera 2A and the rear camera 2B. The bracket 5 accommodates the multi-blade fan 4, and conveys the air sent from the multi-blade fan 4 to the back camera 2A and the rear camera 2B.

As illustrated in FIG. 4B, the bracket 5 includes a camera attachment portion 50, a multi-blade fan accommodating portion 60, and the air guide tube forming portion 70. The camera attachment portion 50 includes a back camera attachment portion 50A and a rear camera attachment portion 50B.

The camera attachment portion 50 is provided to protrude forward from a front surface of a flat plate portion of the bracket 5. The multi-blade fan accommodating portion 60 is formed to be recessed rearward from the front surface of the flat plate portion of the bracket 5. The air guide tube forming portion 70 is formed to be recessed rearward from the front surface of the flat plate portion of the bracket 5. Portions corresponding to the multi-blade fan accommodating portion 60 and the air guide tube forming portion 70 on the front surface of the flat plate portion of the bracket 5 are opened. The multi-blade fan accommodating portion 60, the back camera attachment portion 50A, and the rear camera attachment portion 50B are arranged in this order as viewed from a direction orthogonal to a direction of the air sent from the air outlet 12b of the multi-blade fan 4 (hereinafter referred to as an air blowing direction). In the present embodiment, a direction orthogonal to the air blowing direction is the front-rear direction of the bracket 5 in FIG. 4B (the direction of the rotation axis Ax of the multi-blade fan 4 in FIG. 6). The air guide tube forming portion 70 extends from the multi-blade fan accommodating portion 60 along an arrangement direction of the back camera attachment portion 50A and the rear camera attachment portion 50B.

The camera attachment portion 50 is configured to attach and fix the in-vehicle camera 2 to the bracket 5. The back camera 2A and the rear camera 2B are respectively attached to upper surfaces of the back camera attachment portion 50A and the rear camera attachment portion 50B by fastening members (not illustrated). The back camera attachment portion 50A includes a through hole 50Aa in a center thereof, and accommodates a wiring connected to the back camera 2A. The rear camera attachment portion 50B includes a through hole 50Ba in a center thereof, and accommodates a wiring connected to the rear camera 2B.

Although the back camera 2A and the rear camera 2B are attached to the upper surfaces of the back camera attachment portion 50A and the rear camera attachment portion 50B, a part of the back camera 2A and the rear camera 2B may be accommodated inside the back camera attachment portion 50A and the rear camera attachment portion 50B.

The multi-blade fan accommodating portion 60 accommodates the multi-blade fan 4. As illustrated in FIGS. 4B and 5, the multi-blade fan accommodating portion 60 includes a recessed portion 61 which is recessed rearward from the front surface of the flat plate portion of the bracket 5. The recessed portion 61 has a shape corresponding to the housing 12 of the multi-blade fan body portion 10 of the multi-blade fan 4, and accommodates the housing 12 of the multi-blade fan body portion 10 of the multi-blade fan 4. An opening 61a is formed in a bottom surface of the recessed portion 61. The support portion 13 of the multi-blade fan body portion 10 of the multi-blade fan 4 and the motor 21 are inserted into the opening 61a. The multi-blade fan 4 is accommodated in the multi-blade fan accommodating portion 60 in a state where the support portion 13 of the multi-blade fan body portion 10 and the motor 21 protrude rearward from the bracket 5 via the opening 61a.

The multi-blade fan accommodating portion 60 includes multi-blade fan attachment portions 61b at two positions facing each other on a side surface of the recessed portion 61. The bracket attachment portion 12d of the multi-blade fan 4 is attached to each multi-blade fan attachment portion 61b by a fastening member. A seal member 62 is arranged around the opening 61a in the bottom surface of the recessed portion 61. When the multi-blade fan 4 is attached to the bracket 5, the housing 12 of the multi-blade fan body portion 10 is pressed against the seal member 62, and the seal member 62 is elastically deformed, so that the multi-blade fan 4 is sealed relative to the opening 61a of the bracket 5.

The multi-blade fan accommodating portion 60 includes a drain passage 60c communicating with the drain port 12c of the multi-blade fan 4. The drain passage 60c is an example of a drain hole. The drain passage 60c is a space which communicates with the drain port 12c of the multi-blade fan 4 when the multi-blade fan 4 is accommodated in the multi-blade fan accommodating portion 60. The water discharged from the drain port 12c of the multi-blade fan 4 is discharged from the drain passage 60c of the multi-blade fan accommodating portion 60.

The multi-blade fan accommodating portion 60 communicates with the air guide tube forming portion 70. A portion, which faces the air outlet 12b of the multi-blade fan 4, of the side surface of the recessed portion 61 of the multi-blade fan accommodating portion 60 is opened in the air blowing direction of the air outlet 12b of the multi-blade fan 4 (in the present embodiment, in a leftward direction of the bracket 5). When the multi-blade fan 4 is accommodated in the multi-blade fan accommodating portion 60, the air outlet 12b of the multi-blade fan 4 communicates with the air guide tube forming portion 70, and the air sent from the air outlet 12b of the multi-blade fan 4 is conveyed to the air guide tube forming portion 70. Since the multi-blade fan accommodating portion 60 and the air guide tube forming portion 70 are arranged behind the front surface of the flat plate portion of the bracket 5, the air is sent from the air outlet 12b of the multi-blade fan 4 rearward and leftward relative to the front surface of the flat plate portion of the bracket 5.

The air guide tube forming portion 70 forms at least a part of the air guide tube 8 configured to convey the air sent from the air outlet 12b of the multi-blade fan 4. In the present embodiment, a front surface of the air guide tube forming portion 70 is covered by the bracket cover 6. The air guide tube forming portion 70 forms the air guide tube 8 together with the bracket cover 6. The air guide tube forming portion 70 extends in the air blowing direction from the air outlet 12b of the multi-blade fan 4. The air guide tube forming portion 70 includes a branch portion 71. The air conveyed in the air guide tube forming portion 70 is branched by the branch portion 71. The air guide tube forming unit 70 first conveys the air sent from the air outlet 12b of the multi-blade fan 4 in substantially the same direction as the air blowing direction, and is then branched by the branch portion 71 so as to convey the air to the back camera 2A and the rear camera 2B, respectively.

Since the air guide tube forming portion 70 is arranged behind the front surface of the flat plate portion of the bracket 5, the air guide tube 8 is arranged behind the front surface of the flat plate portion of the bracket 5, and the air is conveyed by the air guide tube 8 rearward and leftward relative to the front surface of the flat plate portion of the bracket 5.

The air guide tube 8 is formed by the air guide tube forming portion 70 and the bracket cover 6. However, for example, the portion of the front surface of the flat plate portion of the bracket 5 corresponding to the air guide tube forming portion 70 may not be opened, and the air guide tube 8 may be formed only by the air guide tube forming portion 70. A detailed structure of the air guide tube 8 will be described later below.

The bracket 5 further includes vehicle body attachment portions 53. The vehicle body attachment portions 53 are provided at both left-right direction end portions of the bracket 5. As illustrated in FIG. 2, each vehicle body attachment portion 53 is attached to the outer panel of the vehicle V such that the front surface of the flat plate portion of the bracket 5 faces downward.

Bracket Cover 6

Next, the bracket cover 6 will be described mainly with reference to FIGS. 4A and 4B.

The bracket cover 6 is configured to cover a part of the front surface of the bracket 5. In the present embodiment, the bracket cover 6 covers the multi-blade fan accommodating portion 60 and the air guide tube forming portion 70. The bracket cover 6 is attached to the front surface of the flat plate portion of the bracket 5 by a fastening unit. The bracket cover 6 includes a first cover portion 6a and a second cover portion 6b. The first cover portion 6a covers a front surface of the multi-blade fan accommodating portion 60. The first cover portion 6a includes a notch 6c communicating with the drain passage 60c of the bracket 5. The notch 6c is an example of a bracket drain hole. The water discharged from the drain port 12c of the multi-blade fan 4 is discharged from the notch 6c of the bracket cover 6 via the drain passage 60c of the bracket 5. The first cover portion 6a includes an opening 6d corresponding to the air intake port 12a of the multi-blade fan 4. The multi-blade fan 4 takes in outside air from the air intake port 12a via the opening 6d of the first cover portion 6a.

The second cover portion 6b covers the front surface of the air guide tube forming portion 70, and forms the air guide tube 8 together with the air guide tube forming portion 70 of the bracket 5. The bracket cover 6 includes the second cover portion 6b. However, when the air guide tube 8 is formed only by the air guide tube forming portion 70, the bracket cover 6 may include only the first cover portion 6a.

Nozzle 9

The nozzle 9 is configured to eject a cleaning liquid and/or air to the in-vehicle camera 2. As illustrated in FIG. 4B, the nozzle 9 is integrally molded with the second cover portion 6b of the bracket cover 6. In the present embodiment, the nozzle 9 includes a back camera nozzle 9A and a rear camera nozzle 9B. The air sent out from the multi-blade fan 4 is conveyed to the back camera nozzle 9A and the rear camera nozzle 9B via the air guide tube 8. The air conveyed to the back camera nozzle 9A and the rear camera nozzle 9B is ejected from tip ends of the back camera nozzle 9A and the rear camera nozzle 9B toward the back camera 2A and the rear camera 2B. The cleaning liquid conveyed from the tank 100 via the connecting hose 103 is ejected from the tip ends of the back camera nozzle 9A and the rear camera nozzle 9B toward the back camera 2A and the rear camera 2B.

The nozzle 9 is integrally molded with the bracket cover 6. However, for example, the nozzle 9 may also be formed separately from the bracket cover 6, and may be integrated with the bracket cover 6 by being assembled to or bonded to the bracket cover 6. When the air guide tube 8 is formed by the air guide tube forming portion 70, the nozzle 9 may be formed integrally with the bracket 5. It should be noted that the term "integrally formed" includes being integrally molded or being separately formed and then integrated by assembling or bonding. A detailed structure of the nozzle 9 will be described later below.

As described above, in the present embodiment, the bracket 5 includes the camera attachment portion 50 and the air guide tube forming portion 70. Therefore, positional misalignment of the air guide tube 8 relative to the in-vehicle camera 2 can be prevented with a simple configuration.

The camera attachment portion 50 includes the back camera attachment portion 50A and the rear camera attachment portion 50B. The air guide tube forming portion 70 includes the branch portion 71 which branches the air guide tube forming portion 70 into two parts. Therefore, the air can be conveyed to each of the back camera 2A and the rear camera 2B.

In addition, the bracket 5 includes the multi-blade fan accommodating portion 60 which communicates with the air guide tube forming portion 70. Therefore, positional misalignment of the multi-blade fan 4 relative to the air guide tube 8 can be prevented with a simple configuration.

The multi-blade fan accommodating portion 60, the back camera attachment portion 50A, and the rear camera attachment portion 50B are arranged side by side in this order. The air guide tube forming portion 70 extends from the multi-blade fan accommodating portion 60 along the arrangement direction of the back camera attachment portion 50A and the rear camera attachment portion 50B. The air from the multi-blade fan 4 is conveyed by the air guide tube forming portion 70 along the arrangement direction of the back camera attachment portion 50A and the rear camera attachment portion 50B. Therefore, the air easily flows smoothly to the rear camera attachment portion 50B which is located farther from the accommodating portion of the multi-blade fan 4. Therefore, a larger amount of air can be conveyed from the multi-blade fan 4 to the rear camera 2B.

The bracket cover 6 forms a part of the air guide tube 8, and forms the air guide tube 8 together with the air guide tube forming portion 70 of the bracket 5. The nozzle 9 is integrally molded with the bracket cover 6. Therefore, positional misalignment of the nozzle 9 relative to the air guide tube 8 can be prevented with a simple configuration.

The bracket 5 includes the drain passage 60c which communicates with the drain port 12c of the multi-blade fan 4. The bracket cover 6 includes the notch which communicates with the drain passage 60c of the bracket 5. Therefore, the water entering from the intake port of the multi-blade fan 4 can be discharged to the outside.

According to the bracket 5 having the above-described structure, the in-vehicle camera 2 is arranged in front of the front surface of the flat plate portion of the bracket 5. The multi-blade fan 4 is arranged behind the front surface of the flat plate portion of the bracket 5. The air outlet 12b of the multi-blade fan 4 sends the air behind the front surface of the flat plate portion of the bracket 5 in a leftward direction of the bracket 5. Therefore, the in-vehicle camera 2 is arranged so as not to overlap the air outlet 12b of the multi-blade fan 4 in the air blowing direction of the air outlet 12b of the multi-blade fan 4. Therefore, an air flow from the multi-blade fan 4 to the in-vehicle camera 2 is improved.

According to the bracket 5 having the above-described structure, the air guide tube 8 is arranged behind the front surface of the flat plate portion of the bracket 5. The air guide tube 8 extends in the air blowing direction from the air outlet 12b of the multi-blade fan 4. Therefore, the air guide tube 8 is arranged so as not to overlap the in-vehicle camera 2 in the air blowing direction of the air outlet 12b of the multi-blade fan 4. Therefore, the air from the multi-blade fan 4 can be smoothly conveyed to the in-vehicle camera 2.

The multi-blade fan 4 and the air guide tube 8 are located rearward from the front surface of the flat plate portion of the bracket 5 and do not protrude from the front surface of the flat plate portion of the bracket 5. Therefore, when the bracket 5 is attached to the outer panel of the vehicle V, the multi-blade fan 4 and the air guide tube 8 do not protrude forward from the outer panel, and thus interference with the in-vehicle camera 2 can be prevented.

Filter 7

Next, the filter 7 will be described mainly with reference to FIGS. 4B and 5.

The filter 7 is configured to prevent foreign matter from entering the multi-blade fan 4 from the outside and to allow air to pass therethrough. The filter 7 is detachably provided on a front side of the air intake port 12a of the multi-blade fan 4. The filter 7 is made of a porous material, and filters air containing foreign matter from the outside. The filter 7 is made of, for example, urethane foam (sponge) or nonwoven fabric. In the present embodiment, as illustrated in FIG. 4B, the filter 7 has a disk shape which has a thickness T, and is arranged between the bracket cover 6 and the air intake port 12a of the multi-blade fan 4. For example, in a case where the filter 7 is made of sponge, the thickness T is formed to be larger than a distance D (FIG. 5) between the bracket cover 6 and the air intake port 12a of the multi-blade fan 4. In this case, the filter 7 is interposed in a compressed state between the bracket cover 6 and the air intake port 12a of the multi-blade fan 4, and can filter finer foreign matter.

As described above, in the present embodiment, the filter 7 is provided in the air intake port 12a of the multi-blade fan 4. Therefore, the foreign matter can be prevented from entering the multi-blade fan 4 from the air intake port 12a. For example, when the multi-blade fan 4 is driven to take in air from the air intake port 12a, foreign matter such as dust can be prevented from entering the multi-blade fan 4.

The multi-blade fan 4 is used as an air blowing portion. Even if the multi-blade fan 4 where a larger amount of foreign matter is more likely to enter is used to continuously take in air, the foreign matter such as dust can be prevented from entering the multi-blade fan 4 by the filter 7.

The filter 7 is detachably attached to the air intake port 12a of the multi-blade fan 4. Therefore, when the filter 7 is deteriorated, the filter 7 can be replaced with a new filter 7.

The vehicular cleaner 3 is attached to the outer panel of the vehicle V, and the air intake port 12a of the multi-blade fan 4 communicates with the outside of the vehicle. The multi-blade fan 4 takes in air outside the vehicle from the air intake port 12a, and thus there is a high possibility that more foreign matter will enter the multi-blade fan 4. However, the filter 7 can prevent the foreign matter outside the vehicle from entering the multi-blade fan 4.

Air Guide Tube 8

Figure 9:
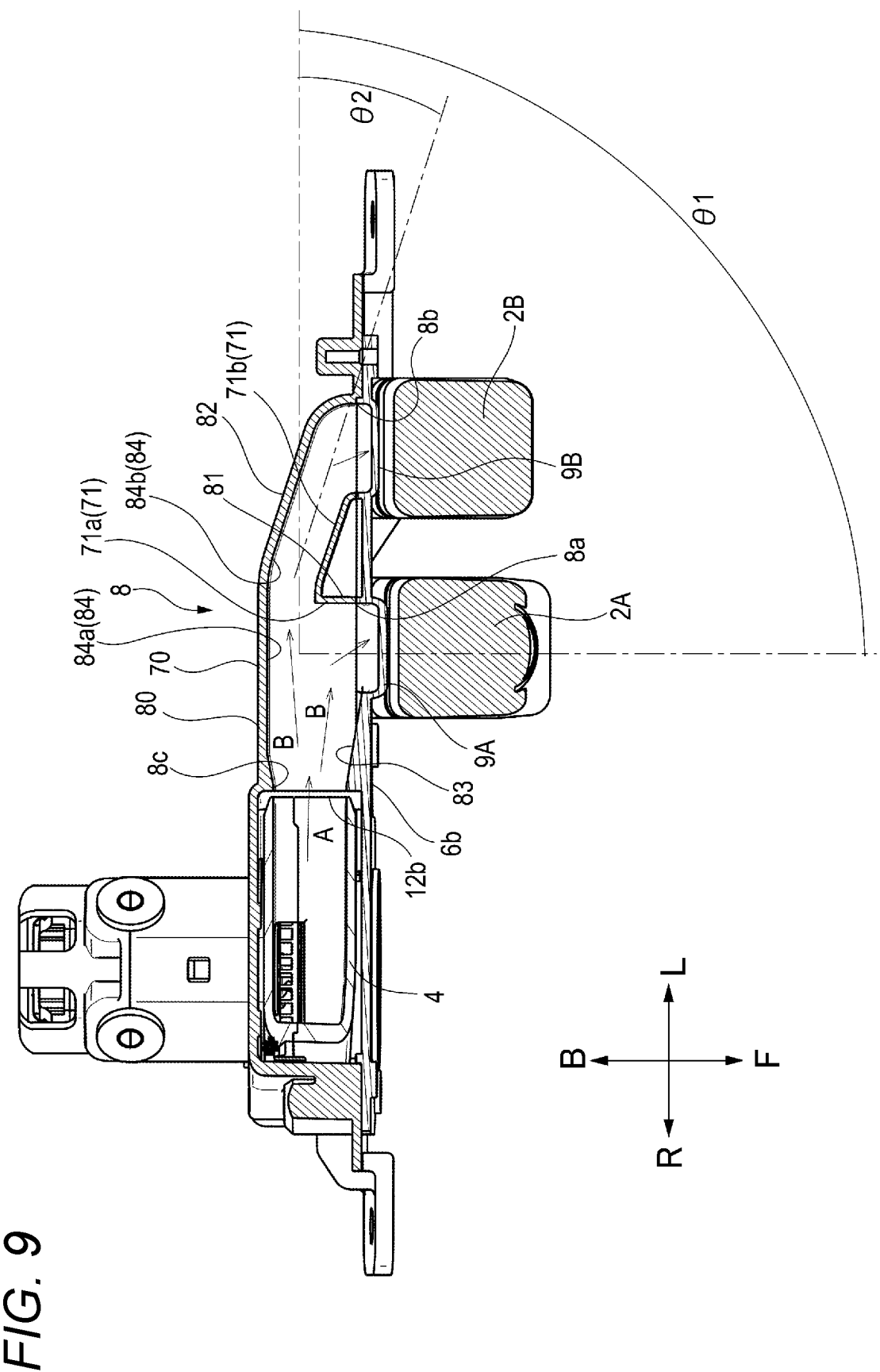
FIG. 9 is a cross-sectional view of the vehicular cleaner unit taken along line IX-IX of FIG. 3.

Next, the air guide tube 8 will be described mainly with reference to FIG. 9. FIG. 9 is a cross-sectional view of the vehicular cleaner unit 1 taken along line IX-IX in FIG. 3.

The air guide tube 8 is configured to convey the air from the multi-blade fan 4 to the back camera 2A and the rear camera 2B. In the present embodiment, the air guide tube 8 is formed by the air guide tube forming portion 70 of the bracket 5 and the second cover portion 6b of the bracket cover 6. The air guide tube 8 communicates with the air outlet 12b of the multi-blade fan 4 accommodated in the multi-blade fan accommodating portion 60. The air guide tube 8 extends in an air blowing direction A from the air outlet 12b of the multi-blade fan 4. The air guide tube 8 includes a first opening 8a, a second opening 8b, and an air introduction port 8c. The first opening 8a is an opening through which the air is sent to the back camera nozzle 9A. The second opening 8b is an opening through which the air is sent to the rear camera nozzle 9B. The first opening 8a and the second opening 8b are formed at positions which do not overlap the air outlet 12b of the multi-blade fan 4 in the air blowing direction A. The first opening 8a and the second opening 8b are opened in a direction intersecting the air blowing direction A. The first opening 8a and the second opening 8b are formed by covering a portion of the air guide tube forming portion 70 of the bracket 5 excluding a portion corresponding to the nozzle 9 with the bracket cover 6. The air introduction port 8c communicates with the air outlet 12b of the multi-blade fan 4 and is opened in the air blowing direction A. The air from the air outlet 12b from the multi-blade fan 4 is introduced into the air guide tube 8 through the air introduction port 8c.

The air guide tube 8 includes a main conveyance path 80, a first branch path 81, and a second branch path 82. The first branch path 81 and the second branch path 82 are formed by being branched from the main conveyance path 80 by the branch portion 71. The main conveyance path 80 conveys the air introduced from the air introduction port 8c in substantially the same direction as the air blowing direction A (hereinafter, referred to as an air conveyance direction B). The first branch path 81 conveys a part of the air conveyed in the main conveyance path 80 and branched by the branch portion 71 to the back camera nozzle 9A. The second branch path 82 conveys a part of the air conveyed in the main conveyance path 80 and branched by the branch portion 71 to the rear camera nozzle 9B.

The first branch path 81 extends from the main conveyance path 80 at a first angle θ1 relative to the air conveyance direction B of the main conveyance path 80, while the second branch path 82 extends from the main conveyance path 80 at a second angle θ2 relative to the air conveyance direction B of the main conveyance path 80. By making the first angle θ1 and the second angle θ2 different from each other, different amounts of air can be conveyed to a plurality of cleaning objects. For example, by setting the second angle θ2 to be smaller than the first angle θ1, the second branch path 82 can convey more air than the first branch path 81.

The branch portion 71 of the air guide tube 8 includes a partition plate 71a and a guide plate 71b. The partition plate 71a constitutes a part of the first branch path 81. The guide plate 71b constitutes a part of the second branch path 82. The partition plate 71a is arranged midway in an air conveyance path of the main conveyance path 80 along a direction intersecting the air conveyance direction B (that is, the air blowing direction A) of the main conveyance path 80. The partition plate 71a is arranged so as to overlap a part of the air outlet 12b of the multi-blade fan 4 in the air blowing direction A. The partition plate 71a extends toward the first opening 8a. A part of the air conveyed in the main conveyance path 80 collides with the partition plate 71a, and the direction in which the air is conveyed is changed toward the first opening 8a. The guide plate 71b is connected to an end portion, which is opposite to an end portion connected to the first opening 8a, of the partition plate 71a, and extends toward the second opening 8b. In the present embodiment, the partition plate 71a extends from a left edge of the first opening 8a (an edge closer to the second branch path 82) toward the main conveyance path 80 in a direction orthogonal to the air blowing direction A. The guide plate 71b extends in a direction intersecting the air blowing direction A from a portion connected to the partition plate 71a toward a right edge of the second opening 8b (an edge closer to the first branch path 81).

The air guide tube 8 includes a first inner surface 83 and a second inner surface 84. The first inner surface 83 is an inner surface which connects the air introduction port 8c and the first opening 8a. The first inner surface 83 extends from the air introduction port 8c toward the first opening 8a in the direction intersecting the air blowing direction A. The second inner surface 84 is an inner surface which connects the air introduction port 8c and the second opening 8b. The second inner surface 84 includes a first portion 84a and a second portion 84b. The first portion 84a extends from the air introduction port 8c in the air blowing direction A. The second portion 84b extends from the first portion 84a toward the second opening 8b in the direction intersecting the air blowing direction A. The second portion 84b extends in the same direction as the guide plate 71b. The first inner surface 83 and the first portion 84a of the second inner surface 84 constitute a part of the main conveyance path 80. The second portion 84b of the second inner surface 84 constitutes a part of the second branch path 82. In the present embodiment, the first inner surface 83 is formed by a part of a rear surface of the bracket cover 6. The second inner surface 84 is formed by an inner surface of the air guide tube forming portion 70 of the bracket 5. The first inner surface 83 may be formed by the bracket 5.

As illustrated in FIG. 9, the air guide tube 8 conveys the air, which is sent from the air outlet 12b of the multi-blade fan 4 via the air introduction port 8c in the air blowing direction A, in the air conveyance direction B of the bracket 5 through the main conveyance path 80. After the air is branched at the branch portion 71, the air guide tube 8 conveys the branched air through the first branch path 81 and the second branch path 82, respectively, and sends out the air through the first opening 8a and the second opening 8b.

As described above, in the present embodiment, the air guide tube 8 includes the partition plate 71a which is arranged midway in the air blowing direction A along the direction intersecting the air blowing direction A. For example, the partition plate 71a extends along the direction orthogonal to the air blowing direction A. Since the direction of a part of the air is changed by using the partition plate 71a, the air can be conveyed to a plurality of cleaning objects (the back camera 2A and the rear camera 2B) by one single air guide tube 8. As a result, the air can be conveyed to the plurality of cleaning objects with a simple structure.

The partition plate 71a overlaps a part of the air outlet 12b of the multi-blade fan 4 in the air blowing direction A. Therefore, the direction of the part of the air conveyed in the air blowing direction A can be more effectively changed by the partition plate 71a.

The partition plate 71a extends toward the first opening 8a corresponding to the back camera 2A. Therefore, the part of the air can be guided toward the first opening 8a corresponding to the back camera 2A while the direction thereof is changed through using the partition plate 71a.

The first opening 8a is formed at a position which does not overlap the air outlet 12b of the multi-blade fan 4 in the air blowing direction A. The air guide tube 8 includes the first inner surface 83 which connects the air outlet 12b (air introduction port 8c) of the multi-blade fan 4 and the first opening 8*a*. Therefore, the air can be guided by the first inner surface 83 toward the first opening 8*a* corresponding to the back camera 2A.

The air guide tube 8 includes the second inner surface 84 which connects the air outlet 12*b* (air introduction port 8*c*) of the multi-blade fan 4 and the second opening 8*b*. The second inner surface 84 includes the first portion 84*a* extending in the air blowing direction A from the air outlet 12*b* of the multi-blade fan 4, and the second portion 84*b* extending from the first portion 84*a* toward the second opening 8*b*. Therefore, the air can be conveyed in the air blowing direction A by the first portion 84*a* of the second inner surface 84, while the air can be guided by the second portion 84*b* toward the second opening 8*b* corresponding to the rear camera 2B.

The air guide tube 8 includes the guide plate 71*b* extending from the end portion, which is opposite to the end portion connected to the first opening 8*a*, of the partition plate 71*a* toward the second opening 8*b*. Therefore, the air can be guided by the guide plate 71*b* toward the second opening 8*b* relative to the rear camera 2B.

The air guide tube 8 conveys different amounts of air to the back camera 2A and the rear camera 2B, respectively. Therefore, cleaning can be performed with an amount of air corresponding to a function and/or a shape of each cleaning object. As a result, the vehicular cleaner unit 1 which efficiently cleans a plurality of cleaning objects having different functions and/or shapes can be provided.

The air guide tube 8 includes the main conveyance path 80, the first branch path 81, and the second branch path 82. The first branch path 81 and the second branch path 82 are formed to convey different amounts of air to the back camera 2A and the rear camera 2B, respectively. Therefore, the first branch path 81 and the second branch path 82 can convey an amount of air corresponding to the function and/or the shape of each cleaning object.

The first branch path 81 extends from the main conveyance path 80 at the first angle θ1 relative to the air conveyance direction of the main conveyance path 80. The second branch path 82 extends from the main conveyance path 80 at the second angle θ2 relative to the air conveyance direction B of the main conveyance path 80. The second angle θ2 is smaller than the first angle θ1. Therefore, since more air flows from the main conveyance path 80 into the second branch path 82 than the first branch path 81, the second branch path 82 can convey a larger amount of air than the first branch path 81.

The multi-blade fan 4, the back camera 2A, and the rear camera 2B are arranged in this order as viewed from the direction orthogonal to the air blowing direction A. Therefore, the rear camera 2B is arranged farther from the multi-blade fan 4 than the back camera 2A. With such a structure, a larger amount of air flows from the main conveyance path 80 into the second branch path 82 than the first branch path 81, so that the second branch path 82 can convey a larger amount of air than the first branch path 81.

The first branch path 81 is formed to convey air to the back camera 2A. The second branch path 82 is formed to convey air to the rear camera 2B. Therefore, cleaning can be performed with an amount of air corresponding to the functions of the back camera 2A and the rear camera 2B. The back camera 2A acquires an image of the vicinity of the host vehicle V during backward movement. The rear camera 2B always acquires an image of a rear side of the vehicle V. For example, by conveying a larger amount of air to the rear camera 2B than the back camera 2A, the rear camera 2B can always acquire a favorable image while adhesion of foreign matter is prevented.

Structure of Nozzle 9

Figure 10:
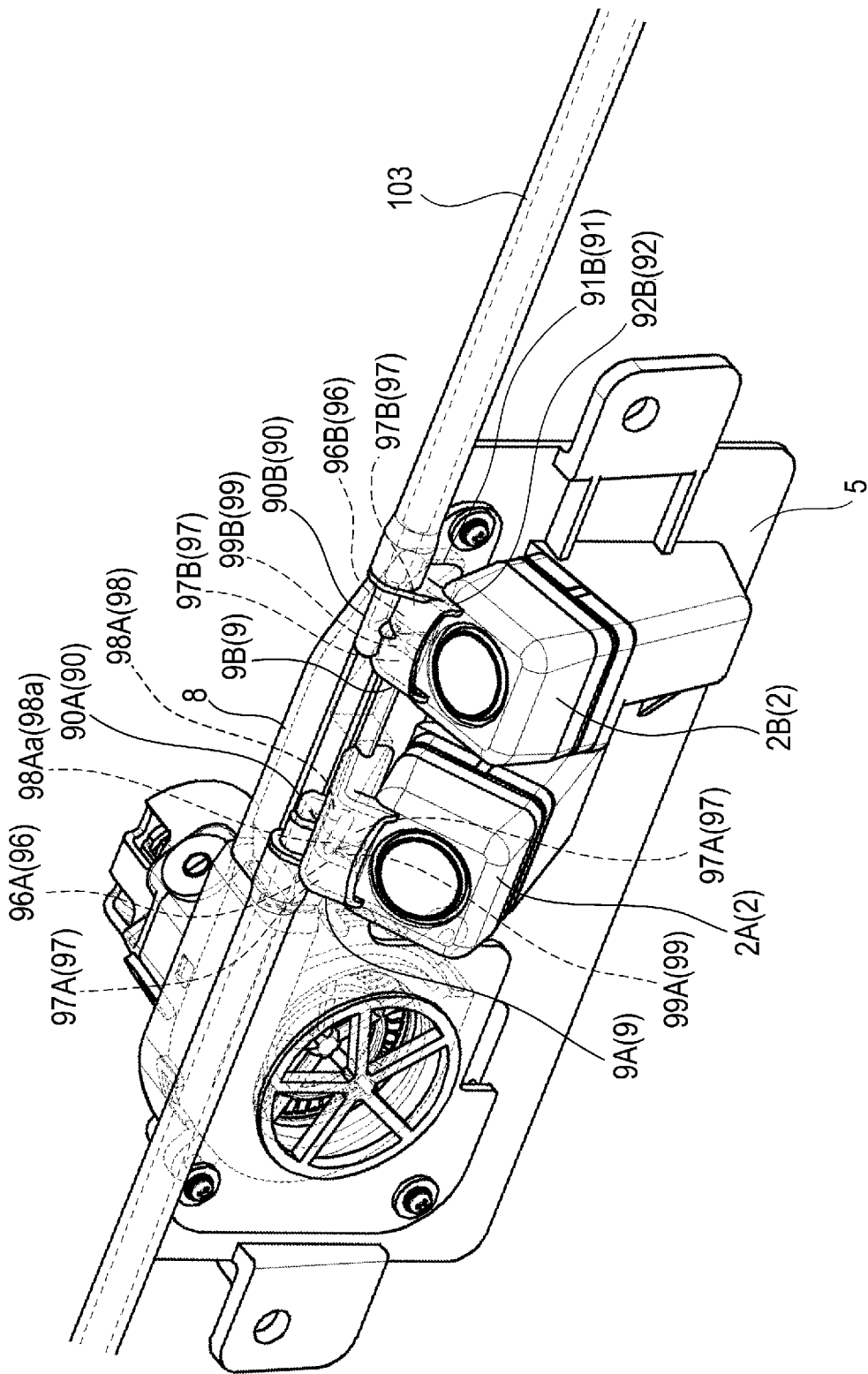
FIG. 10 is a perspective view of the vehicular cleaner unit to which a connecting hose is connected.
Figure 11:
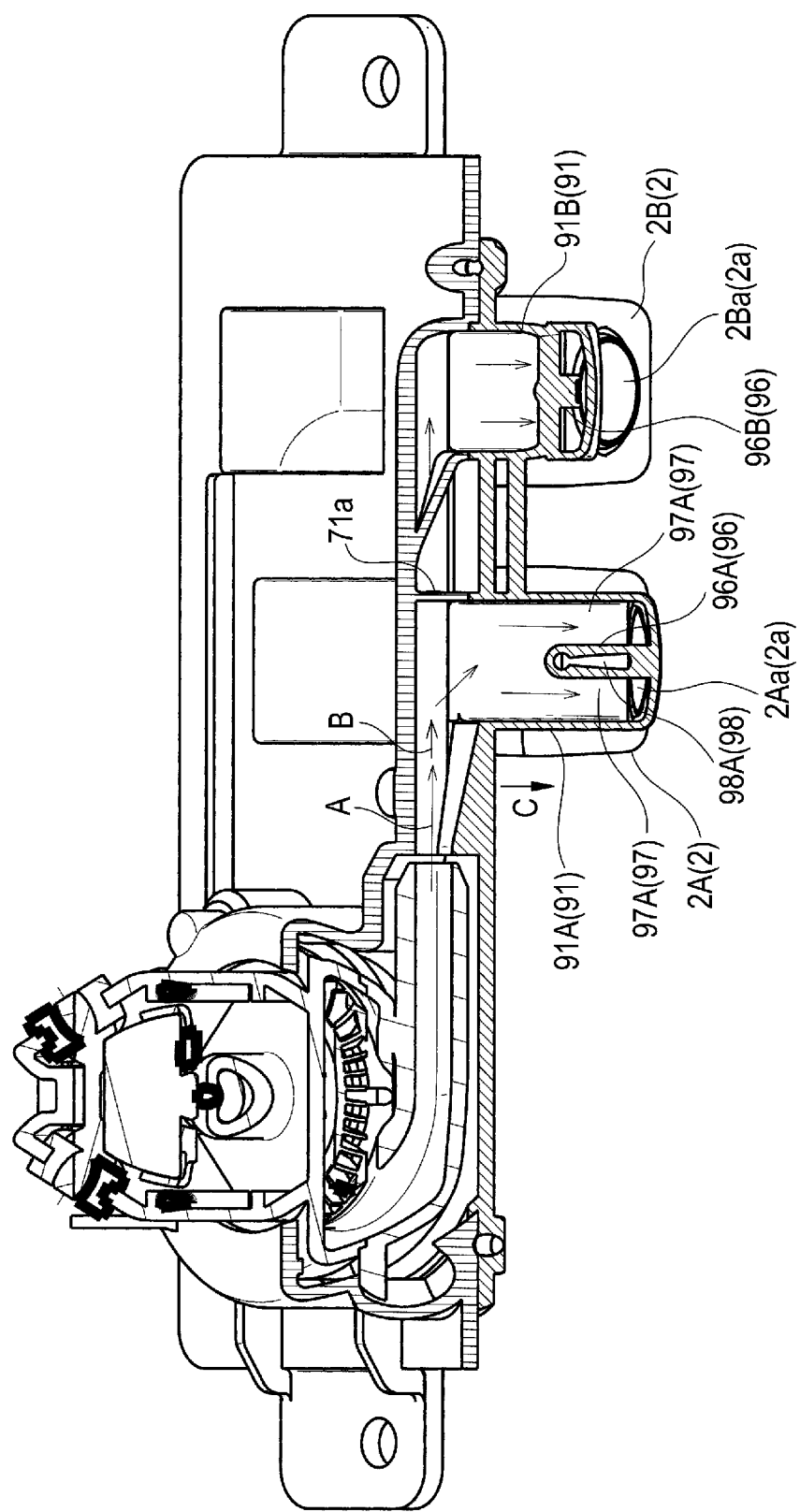
FIG. 11 is a cross-sectional view of the vehicular cleaner unit taken along line XI-XI of FIG. 3.
Figure 12A:
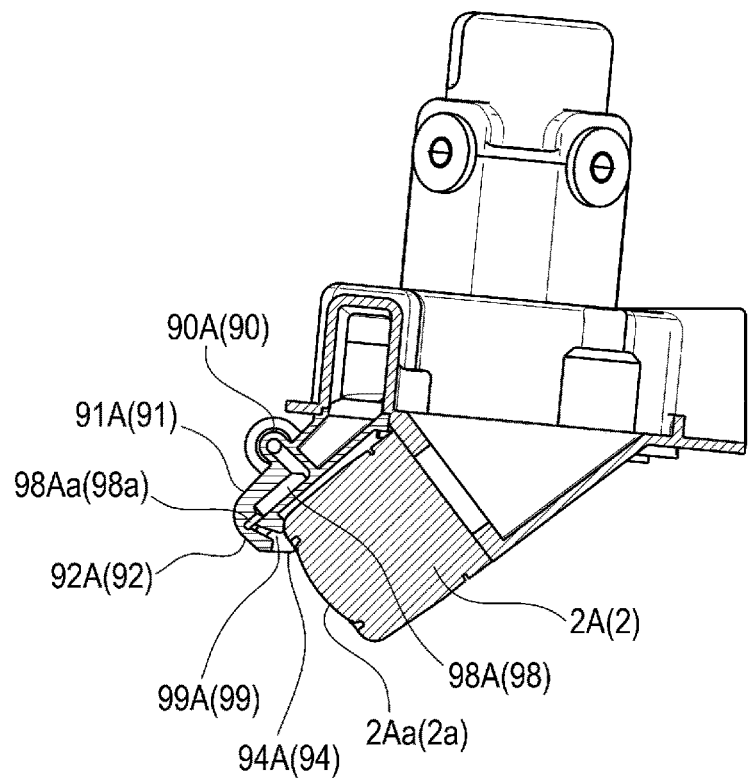
FIG. 12A is a cross-sectional view of the vehicular cleaner unit taken along line XIIA-XIIA of FIG. 2.
Figure 12B:
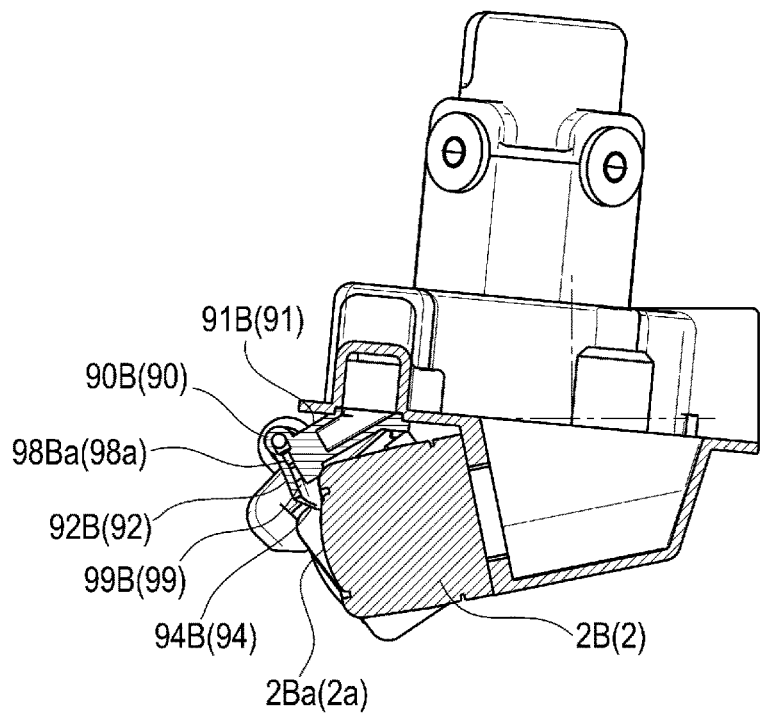
FIG. 12B is a cross-sectional view of the vehicular cleaner unit taken along line XIIB-XIIB of FIG. 2.
Figure 13A:
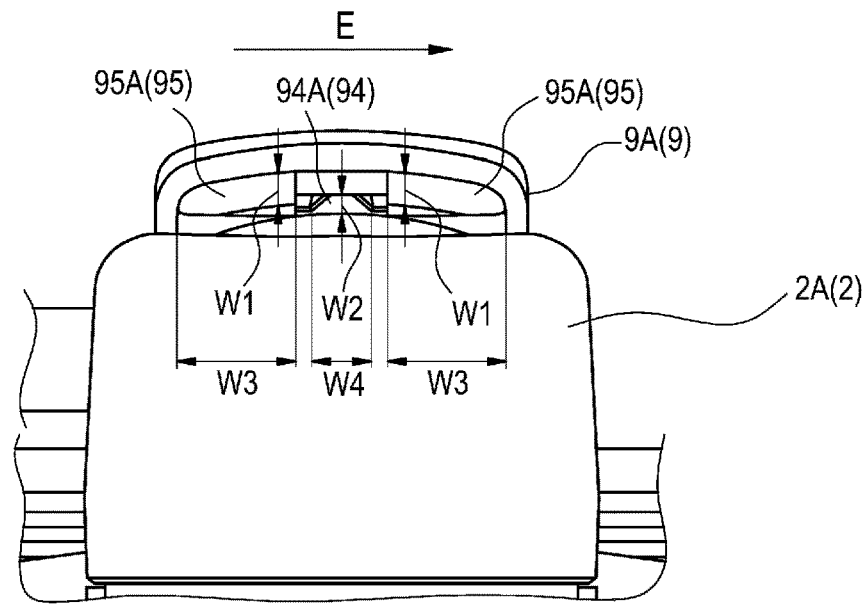
FIG. 13A illustrates an ejection port of a back camera nozzle.
Figure 13B:
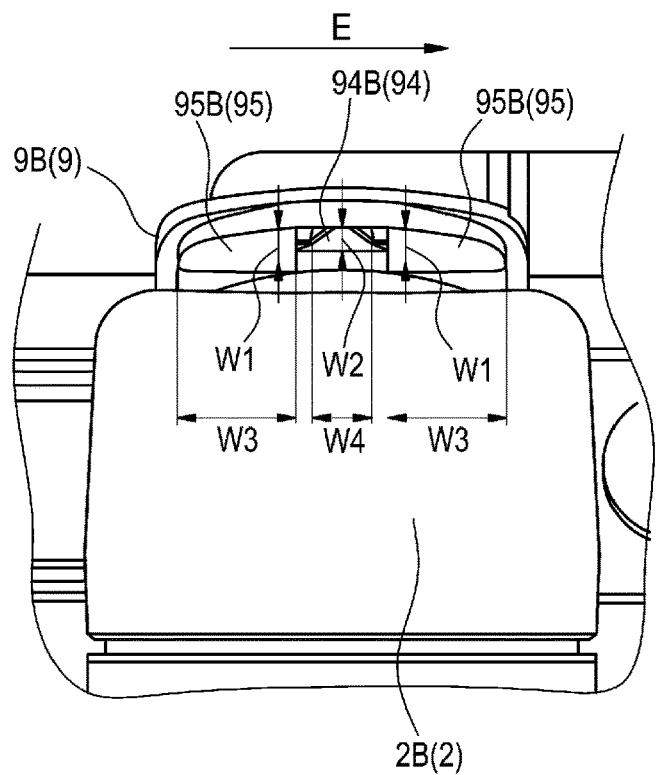
FIG. 13B illustrates an ejection port of a rear camera nozzle.
Figure 14A:
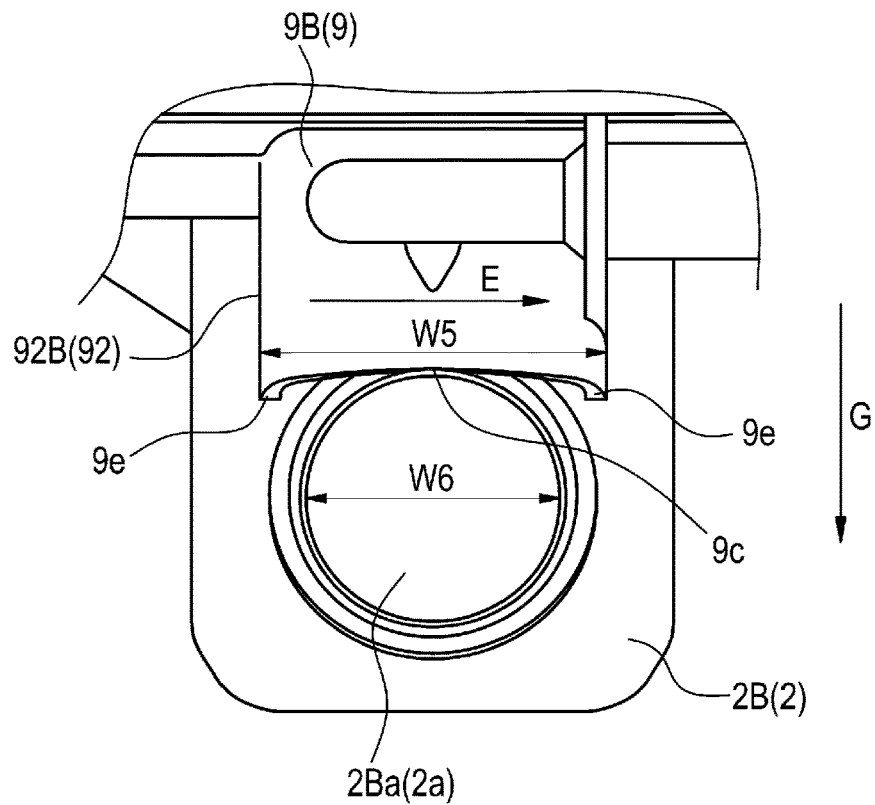
FIG. 14A illustrates a rear camera and the rear camera nozzle.
Figure 14B:
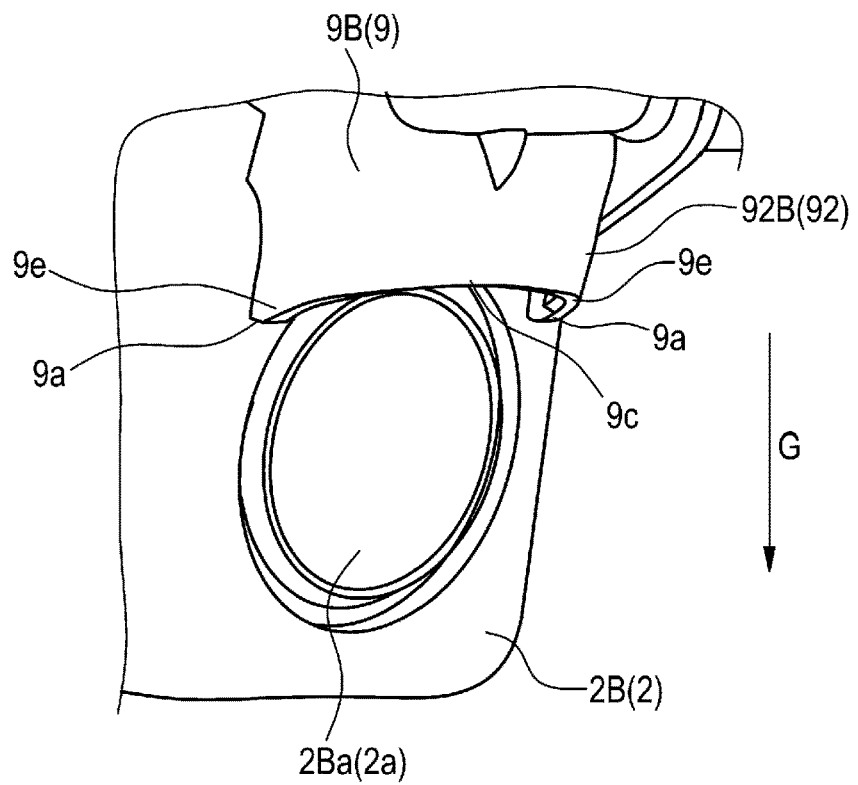
FIG. 14B illustrates the rear camera and the rear camera nozzle.
Figure 15A:
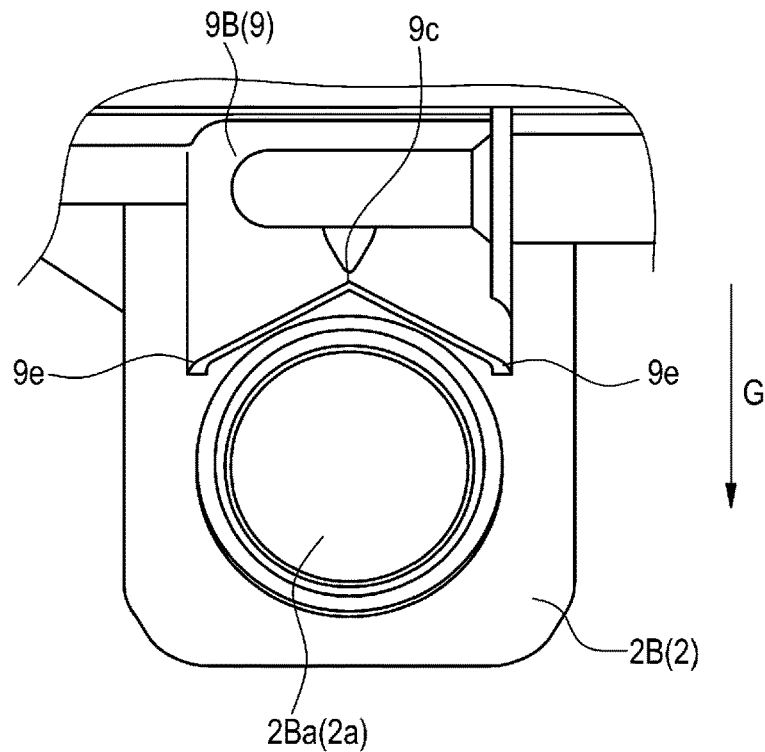
FIG. 15A illustrates a rear camera nozzle of Modification 1.
Figure 15B:
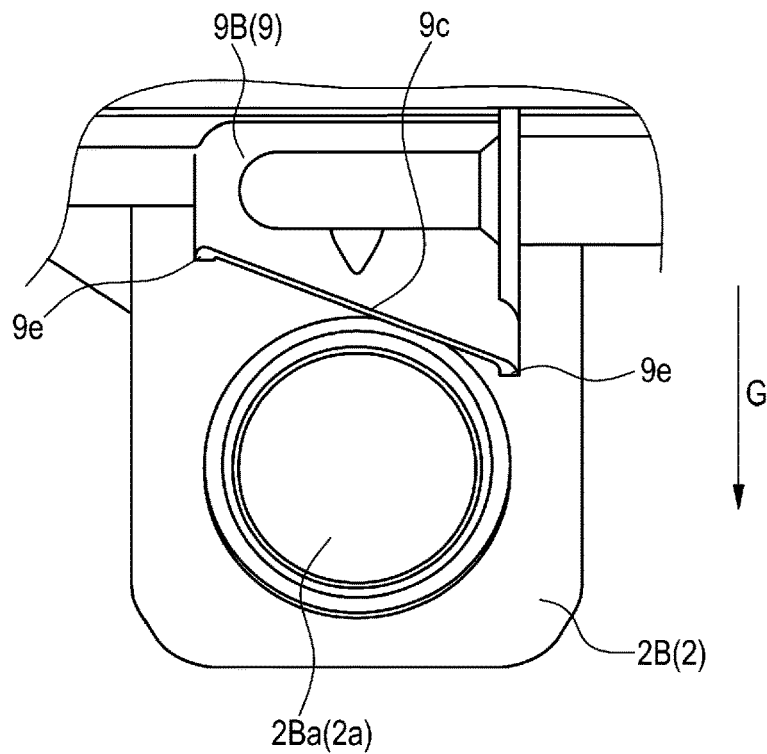
FIG. 15B illustrates a rear camera nozzle of Modification 2.

Next, the structure of the nozzle 9 will be described with reference to FIGS. 10 to 15B. FIG. 10 is a perspective view illustrating the vehicular cleaner unit 1 to which the connecting hose 103 is connected. FIG. 11 is a cross-sectional view of the vehicular cleaner unit 1 taken along line XI-XI of FIG. 3. FIG. 12A is a cross-sectional view of the vehicular cleaner unit 1 taken along line XIIA-XIIA of FIG. 2. FIG. 12B is a cross-sectional view of the vehicular cleaner unit 1 taken along line XIIB-XIIB of FIG. 2. FIG. 13A illustrates an ejection port of the back camera nozzle, and is a view of the ejection port of the back camera nozzle as viewed from below. FIG. 13B illustrates an ejection port of the rear camera nozzle, and is a view of the ejection port of the rear camera nozzle as viewed from below. FIG. 14A illustrates the rear camera and the rear camera nozzle as viewed from a front side of the rear camera 2B. FIG. 14B illustrates the rear camera and the rear camera nozzle when the rear camera 2B is viewed obliquely. FIG. 15A illustrates a rear camera nozzle of Modification 1. FIG. 15B illustrates a rear camera nozzle of Modification 2. Common members of the back camera nozzle 9A and the rear camera nozzle 9B are denoted by the same reference numerals. "A" is added to ends of the reference numerals of the members of the back camera nozzle 9A, while "B" is added to ends of the reference numerals of the members of the rear camera nozzle 9B.

As illustrated in FIG. 10, the nozzle 9 communicates with the air guide tube 8. The nozzle 9 conveys the air from the air guide tube 8, and ejects the air from a tip end thereof toward the in-vehicle camera 2 which serves as the cleaning object. The nozzle 9 includes a cleaning liquid introduction path 90 which is connected to the connecting hose 103. The nozzle 9 ejects the cleaning liquid conveyed via the connecting hose 103 and the cleaning liquid introduction path 90 from the tip end toward the in-vehicle camera 2 which serves as the cleaning object. The connecting hose 103 is routed from a back side of the bracket 5 to a front side of the bracket 5 via a through hole (not illustrated). In the present embodiment, the nozzle 9 includes the back camera nozzle 9A configured to eject toward the back camera 2A and the rear camera nozzle 9B configured to eject toward the rear camera 2B. In the following description, a configuration common to the back camera nozzle 9A and the rear camera nozzle 9B will be described as a configuration of the nozzle 9, and description of a configuration of each of the back camera nozzle 9A and the rear camera nozzle 9B will be omitted.

Linear Portion 91 of Nozzle 9

As illustrated in FIG. 11, the nozzle 9 extends from the air guide tube 8 in a direction intersecting the air conveyance direction B (hereinafter, also referred to as a nozzle extension direction C). In the present embodiment, the nozzle extension direction C is orthogonal to the air conveyance direction B.

As illustrated in FIGS. 10 to 12B, the nozzle 9 includes a linear portion 91 and a tip end portion 92. The linear portion 91 communicates with the air guide tube 8, and linearly extends from the air guide tube 8 in the direction intersecting with the air conveyance direction B (nozzle extension direction C). For example, as illustrated in FIGS. 12A and 12B, the linear portion 91 extends from the air guide tube 8 toward a lens 2a of the in-vehicle camera 2. Since the back camera 2A and the rear camera 2B are attached to the air guide tube 8 at different positions and in different directions, the back camera nozzle 9A and the rear camera nozzle 9B extend in different directions. For example, as illustrated in FIG. 12A, a linear portion 91A of the back camera nozzle 9A extends in substantially the same direction as a longitudinal direction of a housing of the back camera 2A. Meanwhile, as illustrated in FIG. 12B, a linear portion 91B of the rear camera nozzle 9B extends slightly obliquely relative to a longitudinal direction of a housing of the rear camera 2B. The linear portion 91B extends to approach the housing of the rear camera 2B as approaching a lens 2Ba of the rear camera 2B.

The tip end portion 92 ejects a cleaning liquid or air from a tip end thereof which is opened toward the in-vehicle camera 2. The tip end portion 92 extends from a tip end of the linear portion 91 in a direction toward the lens 2a of the in-vehicle camera 2. A width direction E (see FIG. 14A) of the tip end portion 92 is orthogonal to the nozzle extension direction C.

As illustrated in FIG. 11, the nozzle extension direction C of the nozzle is the same as an arrangement direction of the partition plate 71a of the air guide tube 8. The linear portion 91 conveys the air sent out from the air guide tube 8 while guiding the air in such a manner that the air whose direction is changed due to collision with the partition plate 71a is conveyed in the arrangement direction of the partition plate 71a. In the present embodiment, the linear portion 91 conveys the air sent out from the air guide tube 8 while guiding the air in a direction orthogonal to the air conveyance direction B (nozzle extension direction C).

In this way, in the present embodiment, the linear portion 91 of the nozzle 9 extends in the direction which intersects the air conveyance direction B and is orthogonal to the width direction E of the tip portion 92 of the nozzle 9 (nozzle extension direction C). The linear portion 91 guides the air from the air guide tube 8 in the nozzle extension direction C. Therefore, the direction of the air can be changed from the air conveyance direction B to the nozzle extension direction C by the linear portion 91 of the nozzle 9. For example, even when a surface to be cleaned of the cleaning object (for example, the lens 2a of the in-vehicle camera 2) is located at a position which does not overlap with the multi-blade fan 4 in the air blowing direction A, the direction of the air can be changed toward the surface to be cleaned of the cleaning object by the nozzle 9 and conveyed thereto. Therefore, the air can be ejected from the nozzle 9 in a desired direction.

In the present embodiment, the nozzle extension direction C is orthogonal to the air conveyance direction B. Therefore, for example, even when the cleaning object whose surface to be cleaned is located at a tip end thereof extends in the direction orthogonal to the air conveyance direction B, the direction of the air can be changed by the nozzle 9 toward the direction in which the cleaning object extends and conveyed thereto.

A structure of the nozzle 9 which includes the linear portion 91 is also applicable to a nozzle which only ejects air. Even in the case of the nozzle which only ejects air, the same effect as described above can be obtained.

Gas and Liquid Structure of Nozzle 9

As illustrated in FIGS. 10 and 11, the nozzle 9 includes a division portion 96 at least at the tip end portion 92 at a substantially central position in a width direction of the nozzle 9. The back camera nozzle 9A includes a division portion 96A at a substantially central position in a width direction of the back camera nozzle 9A from the middle of conveyance of the linear portion 91A to a tip end portion 92A. The rear camera nozzle 9B includes a division portion 96B at a substantially central position in a width direction of the rear camera nozzle 9B at a tip end portion 92B. Air conveyance paths 97, 97 are formed on both sides of the division portion 96, and a cleaning liquid conveyance path 98 is formed inside the division portion 96.

As illustrated in FIGS. 12A to 13B, the air conveyance paths 97, 97 communicate with air ejection ports 95, 95, respectively, while the cleaning liquid conveyance path 98 communicates with a cleaning liquid ejection port 94 via a cleaning liquid ejection path 99. The cleaning liquid ejection port 94 and the air ejection ports 95, 95 are formed at the tip end of the tip end portion 92 of the nozzle 9. The cleaning liquid ejection port 94 and the air ejection ports 95, 95 are formed as independent ejection ports due to the division portion 96.

The air conveyed in the nozzle 9 is branched by the division portion 96 and conveyed to the air conveyance paths 97, 97. The air conveyed in the air conveyance paths 97, 97 is ejected from the air ejection ports 95, 95.

As illustrated in FIGS. 12A and 12B, the cleaning liquid conveyance path 98 communicates with the cleaning liquid introduction path 90. A tip end opening 98a of the cleaning liquid conveyance path 98 is formed to be narrowed so as to have a small diameter. The tip end opening 98a of the cleaning liquid conveyance path 98 and the cleaning liquid ejection port 94 communicate with each other through the cleaning liquid ejection path 99. The cleaning liquid ejection path 99 is formed to become wider toward the cleaning liquid ejection port 94. The cleaning liquid introduced from the cleaning liquid introduction path 90 is conveyed by the cleaning liquid conveyance path 98, pressurized at the tip end opening 98a of the cleaning liquid conveyance path 98, and then ejected from the cleaning liquid ejection port 94 via the cleaning liquid ejection path 99.

As illustrated in FIGS. 13A and 13B, the air ejection ports 95, 95 are arranged on both sides of the cleaning liquid ejection port 94 in the width direction E of the tip end portion 92 of the nozzle 9. The cleaning liquid is ejected from a center of the tip end of the nozzle 9 through the cleaning liquid ejection port 94, and the air is ejected from both end portions of the tip end of the nozzle 9 through the air ejection ports 95, 95.

Shapes of the air ejection ports 95, 95 and a shape of the cleaning liquid ejection port 94 are different from each other. For example, as illustrated in FIGS. 13A and 13B, as for the air ejection ports 95, 95, a width thereof in a direction perpendicular to the width direction E of the tip end portion 92 is referred to as W1, while a width thereof in a direction parallel to the width direction E of the tip end portion 92 is referred to as W3. As for the cleaning liquid ejection port 94, a width thereof in the direction perpendicular to the width direction E of the tip end portion 92 is referred to as W2, while a width thereof in the direction parallel to the width direction E of the tip end portion 92 is referred to as W4. In the present embodiment, the width W1 of the air ejection ports 95, 95 is wider than the width W2 of the cleaning liquid ejection port 94. The width W3 of the air ejection ports 95, 95 is wider than the width W4 of the cleaning liquid ejection port 94. An area of a surface which is orthogonal to an air ejection direction of the air ejection ports 95, 95 is larger than an area of a surface perpendicular to a cleaning liquid ejection direction of the cleaning liquid ejection port 94.

The width W1 and the width W3 of the air ejection ports 95, 95 are set to be wider than the width W2 and the width W4 of the cleaning liquid ejection port 94. However, a configuration in which one of the width W1 and the width W3 of the air ejection ports 95, 95 is set to be wider than the corresponding width W2 and the width W4 of the cleaning liquid ejection port 94 may also be adopted.

Since the width W1 and the width W3 of the air ejection ports 95, 95 are set to be wider than the width W2 and the width W4 of the cleaning liquid ejection port 94, an area of each of the air ejection ports 95, 95 is larger than an area of the cleaning liquid ejection port 94. However, for example, the air ejection ports 95, 95 and the cleaning liquid ejection port 94 may also be formed such that the area of each of the air ejection ports 95, 95 is larger than the area of the cleaning liquid ejection port 94 regardless of the width W1 and the width W3 of the air ejection ports 95, 95 and the width W2 and the width W4 of the cleaning liquid ejection port 94.

In this way, in the present embodiment, the air ejection ports 95, 95 are arranged on both sides of the cleaning liquid ejection port 94. Therefore, water droplets and foreign matters adhering to the tip end of the nozzle 9 can be removed by the air ejected from the air ejection ports 95, 95. For example, the water droplets and foreign matter adhering to the tip end of the nozzle 9 and water droplets and foreign matter adhering to the cleaning liquid ejection port 94 can be removed by the air ejected from the air ejection ports 95, 95. The water droplets are, for example, a remainder of the cleaning liquid or water droplets of rain water. Since the air ejection ports 95, 95 and the cleaning liquid ejection port 94 are formed in one single nozzle 9, appearance of the vehicular cleaner 3 is improved as compared with a case where a plurality of independent nozzles are provided for gas and liquid.

The width W1 of the air ejection ports 95, 95 is wider than the width W2 of the cleaning liquid ejection port 94. Therefore, the air ejection ports 95, 95 can eject air without interfering with a flow of the air. Meanwhile, the cleaning liquid ejection port 94 can eject the cleaning liquid while widely diffusing the cleaning liquid.

The width W3 of the air ejection ports 95, 95 is wider than the width W4 of the cleaning liquid ejection port 94. Therefore, the air ejection ports 95, 95 can eject air without interfering with the flow of the air. Meanwhile, the cleaning liquid ejection port 94 can eject the cleaning liquid while widely diffusing the cleaning liquid.

The area of the surface which is orthogonal to the air ejection direction of the air ejection ports 95, 95 is larger than the area of the surface perpendicular to the cleaning liquid ejection direction of the cleaning liquid ejection port 94. Therefore, the air ejection ports 95, 95 can eject air without interfering with the flow of the air. Meanwhile, the cleaning liquid ejection port 94 can eject the cleaning liquid while widely diffusing the cleaning liquid.

Tip End Shape of Nozzle 9

The tip end of the nozzle 9 is formed such that at least one width direction end portion thereof extends to an ejection direction downstream side relative to a central portion. In the present embodiment, as illustrated in FIGS. 14A and 14B, the tip end of the nozzle 9 is formed such that both end portions 9e, 9e in the width direction E of the tip end portion 92 extend to a downstream side in an ejection direction G relative to a central portion 9c. The tip end of the nozzle 9 extends to the downstream side in the ejection direction G while being curved from the central portion 9c to each end portion 9e.

The tip end of the nozzle 9 is not limited to such a curved shape. For example, as illustrated in FIG. 15A, the tip end may extend linearly from the central portion 9c to the end portions 9e, 9e toward the downstream side in the ejection direction G. The both end portions 9e, 9e of the tip end of the nozzle 9 in the width direction E extend to the downstream side in the ejection direction G relative to the central portion 9c. However, for example, as illustrated in FIG. 15B, a configuration in which the tip end extends to the downstream side while being inclined relative to the ejection direction G from one of the end portion 9e to the other end portion 9e may also be adopted.

As illustrated in FIG. 14B, the both end portions 9e, 9e of the nozzle 9 includes contact portions 9a, 9a which are in contact with the in-vehicle camera 2, respectively. In the present embodiment, the contact portions 9a, 9a are in contact with the in-vehicle camera 2 not only at the tip end of the nozzle 9 but also across the tip end portion 92. Although the contact portions 9a, 9a are in contact with the in-vehicle camera 2 not only at the tip end of the nozzle 9 but also across the tip end portion 92, a configuration in which the contact portions 9a, 9a is at least in contact with the tip end portion of the nozzle 9 may also be adopted.

A width W5 of the tip end of the nozzle 9 is set to be larger than a width W6 of the surface to be cleaned (for example, the lens 2a) of the in-vehicle camera 2.

In FIGS. 14A and 15B, the structures of the rear camera 2B and the rear camera nozzle 9B are illustrated as the in-vehicle camera 2 and the nozzle 9, while the back camera 2A and the back camera nozzle 9A also have the same structures. In a case where the vehicular cleaner 3 includes a plurality of the nozzles 9, tip ends of the plurality of nozzles 9 may have shapes different from each other. That is, the tip ends of the back camera nozzle 9A and the rear camera nozzle 9B may have shapes different from each other. For example, although the tip ends of the back camera nozzle 9A and the rear camera nozzle 9B have shapes illustrated in FIG. 14A, there may be a difference in an ejection direction length and/or a width direction length between the central portion and the end portion, or there may be a difference in a degree of curve from the central portion to the end portion. The tip end of the back camera nozzle 9A may have the shape illustrated in FIG. 14A while the tip end of the rear camera nozzle 9B may have a shape different from the shape illustrated in FIG. 14A, for example, a shape illustrated in FIG. 15A.

As described above, in the present embodiment, the one end 9e of the tip end of the nozzle 9 in the width direction E extends to the downstream side in the ejection direction G relative to the central portion 9c. Therefore, since water droplets adhering to the central portion 9c of the tip end of the nozzle 9 flow to the end portion, the water droplets adhering to the tip end of the nozzle 9 can be prevented from being detected by the in-vehicle camera 2 (an example of a detection surface of an in-vehicle sensor).

The both end portions 9e, 9e of the tip end of the nozzle 9 in the width direction E extend to the downstream side in the ejection direction relative to the central portion 9c. Therefore, since the water droplets adhering to the central portion 9c of the tip end of the nozzle 9 flow to the both end portions 9e, 9e, the water droplets adhering to the tip end of the nozzle 9 can be prevented from being reflected on the in-vehicle camera 2.

The end portion of the tip end of the nozzle 9 includes the contact portion 9a which is in contact with the in-vehicle camera 2. Therefore, since the water droplets adhering to the central portion of the tip end of the nozzle 9 flow to the in-vehicle camera 2 via the contact portion 9a of the end portion, the water droplets can be prevented from falling from the end portion of the tip end of the nozzle 9.

The tip end of the nozzle 9 extends to the downstream side in the ejection direction while being curved from the central portion 9c to each end portion 9e. Therefore, since the water droplets adhering to the central portion 9c of the tip end of the nozzle 9 smoothly flow to the end portion 9e, the water droplets adhering to the tip end of the nozzle 9 can be prevented from being detected by the in-vehicle camera 2.

The vehicular cleaner 3 includes the plurality of nozzles 9, and the tip ends of the plurality of nozzles 9 have shapes different from each other. Therefore, the nozzles 9 having the different tip end shapes can be used in accordance with shapes and directions of each surface to be cleaned of a plurality of the in-vehicle cameras 2. For example, there is a difference in the ejection direction length between the central portion and the end portion of the tip end of the nozzle 9, a difference in the width direction length between the central portion and the end portion, or a difference in the degree of curve from the central portion to the end portion. Therefore, the water droplets adhering to the central portion of the tip end of the nozzle 9 can be efficiently caused to flow to the end portion in accordance with the shape and the direction of each surface to be cleaned of the plurality of in-vehicle cameras 2.

The nozzle 9 ejects the cleaning liquid and the air toward the lens 2a of the in-vehicle camera 2. Therefore, the cleaning liquid remaining at the tip end of the nozzle 9 after ejecting the cleaning liquid can be prevented from being detected by the in-vehicle camera 2.

The width of the tip end of the nozzle 9 is larger than the width of the surface to be cleaned (for example, the lens 2a) of the in-vehicle camera 2. Therefore, since the water droplets adhering to the central portion 9c of the tip end of the nozzle 9 flow to the end portion 9e, the water droplets adhering to the tip end of the nozzle 9 can be more reliably prevented from being detected by the in-vehicle camera 2.

Such a tip end shape of the nozzle 9 can also be applied to a nozzle which only ejects air or a nozzle which only ejects cleaning liquid. Even in the case of the nozzle which only ejects air or the nozzle which only ejects cleaning liquid, the same effects as those described above can still be obtained.

Second Embodiment

Figure 16:
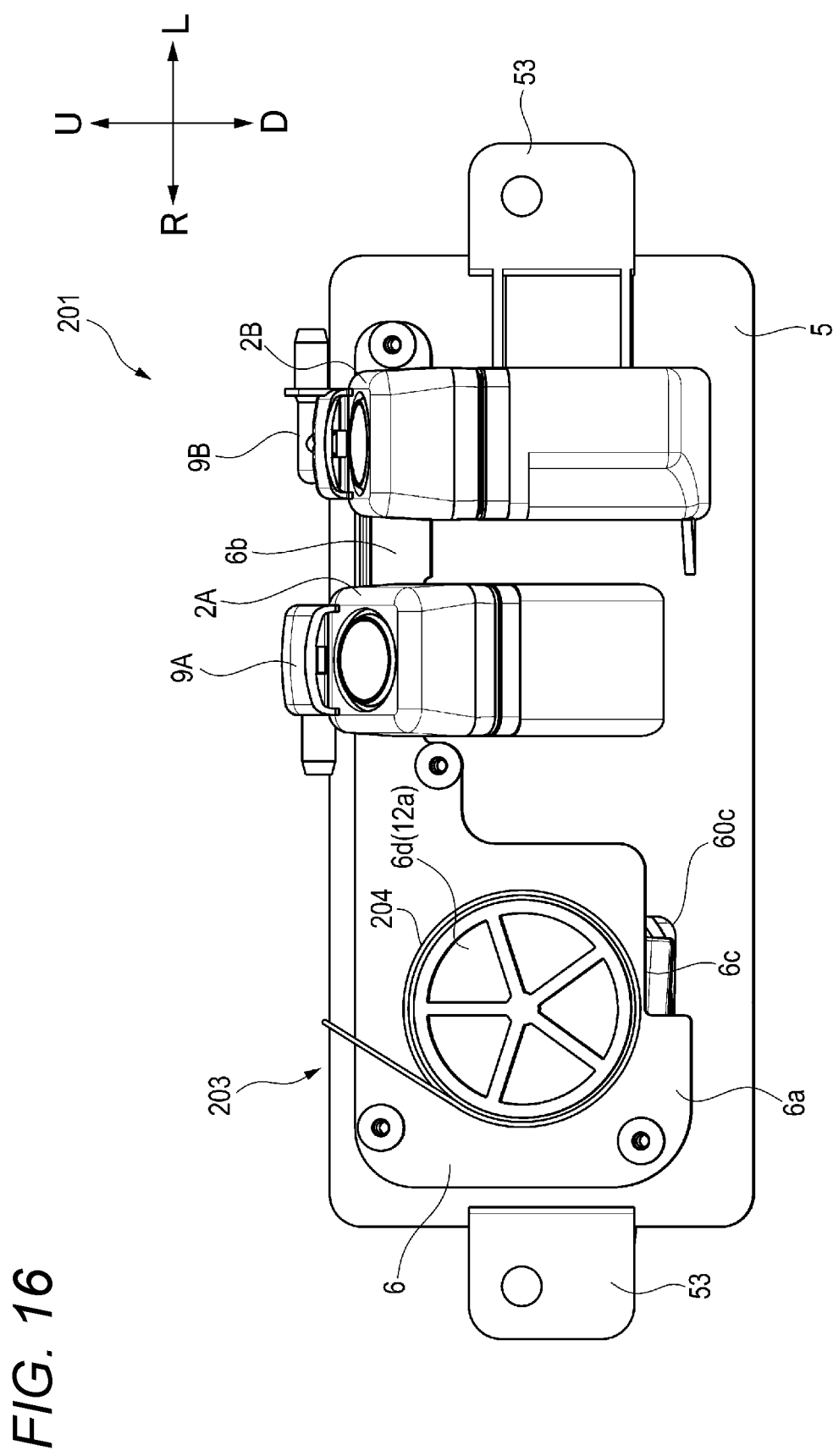
FIG. 16 is a front view of a vehicular cleaner unit according to a second embodiment of the present disclosure.

Next, a vehicular cleaner 203 according to a second embodiment will be described with reference to the drawings. FIG. 16 is a front view illustrating a vehicular cleaner unit 201 according to the second embodiment. In description of the second embodiment, members having the same reference numerals as those of the members already described in the description of the first embodiment will not be described for convenience of description.

The vehicular cleaner unit 201 of the second embodiment includes a heating wire 204 provided around the air intake port 12a of the multi-blade fan 4, which is different from the first embodiment. A configuration other than the heat wire 204 of the vehicular cleaner unit 201 is the same as that of the first embodiment, and description thereof is omitted for convenience of description.

The heating wire 204 is an example of a heating unit. The heating wire 204 is provided on a front surface of the bracket cover 6 so as to surround a periphery of the opening 6d of the bracket cover 6. The heating wire 204 extends upward from the periphery of the opening 6d of the bracket cover 6, and is routed to the back side of the bracket 5 and connected to a predetermined heat source (not illustrated) in the vehicle. The heating wire 204 warms the periphery of the air intake port 12a of the multi-blade fan 4 by heat transferred from the heat source.

As described above, in the above embodiment, the periphery of the air intake port 12a of the multi-blade fan 4 is warmed by the heating wire 204 provided around the air intake port 12a of the multi-blade fan 4. Therefore, snow can be prevented from adhering to the air intake port 12a of the multi-blade fan 4 or the periphery thereof when it snows or when snow accumulated on a road surface is rolled up. Water droplets adhering to the air intake port 12a of the multi-blade fan 4 or the periphery thereof can also be prevented from freezing.

In the above embodiment, the heating wire 204 is arranged on the front surface of the bracket cover 6. However, for example, the heating wire 204 may also be arranged on the rear surface of the bracket cover 6. The heat wire 204 may also be arranged on a member other than the bracket cover 6.

Instead of the heating wire 204, another method may be used to warm the periphery of the air intake port 12a of the multi-blade fan 4. For example, air may be branched from the air guide tube 8, and the branched air may be blown to the opening 6d of the bracket cover 6 and the periphery thereof, or to the air intake port 12a of the multi-blade fan 4 and the periphery thereof. In these cases, the adhesion of snow to the air intake port 12a of the multi-blade fan 4 or the periphery thereof and the freezing of adhering water droplets can still be prevented.

Third Embodiment

Figure 17:
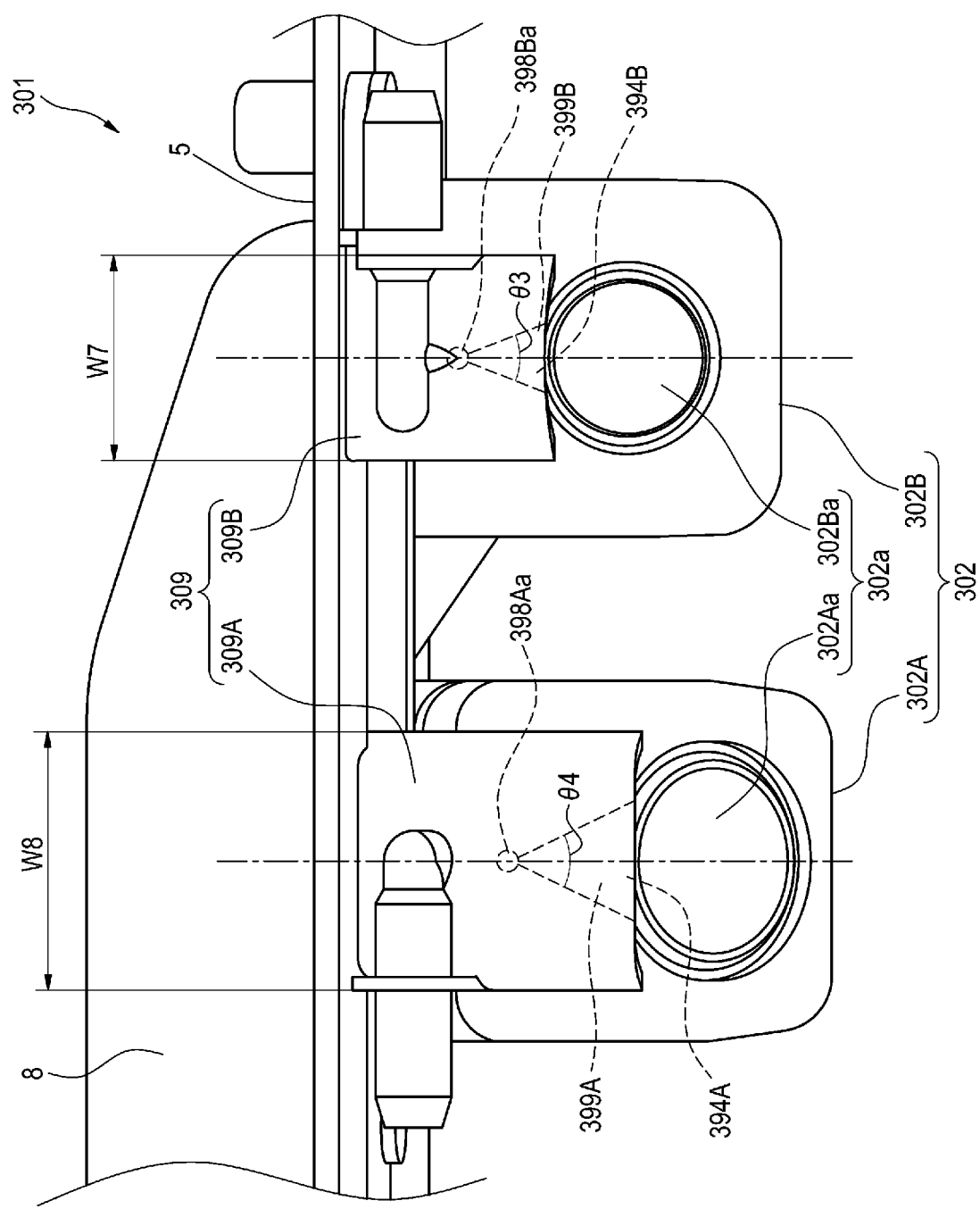
FIG. 17 illustrates an in-vehicle camera and a nozzle of a vehicular cleaner unit according to a third embodiment of the present disclosure.
Figure 18:
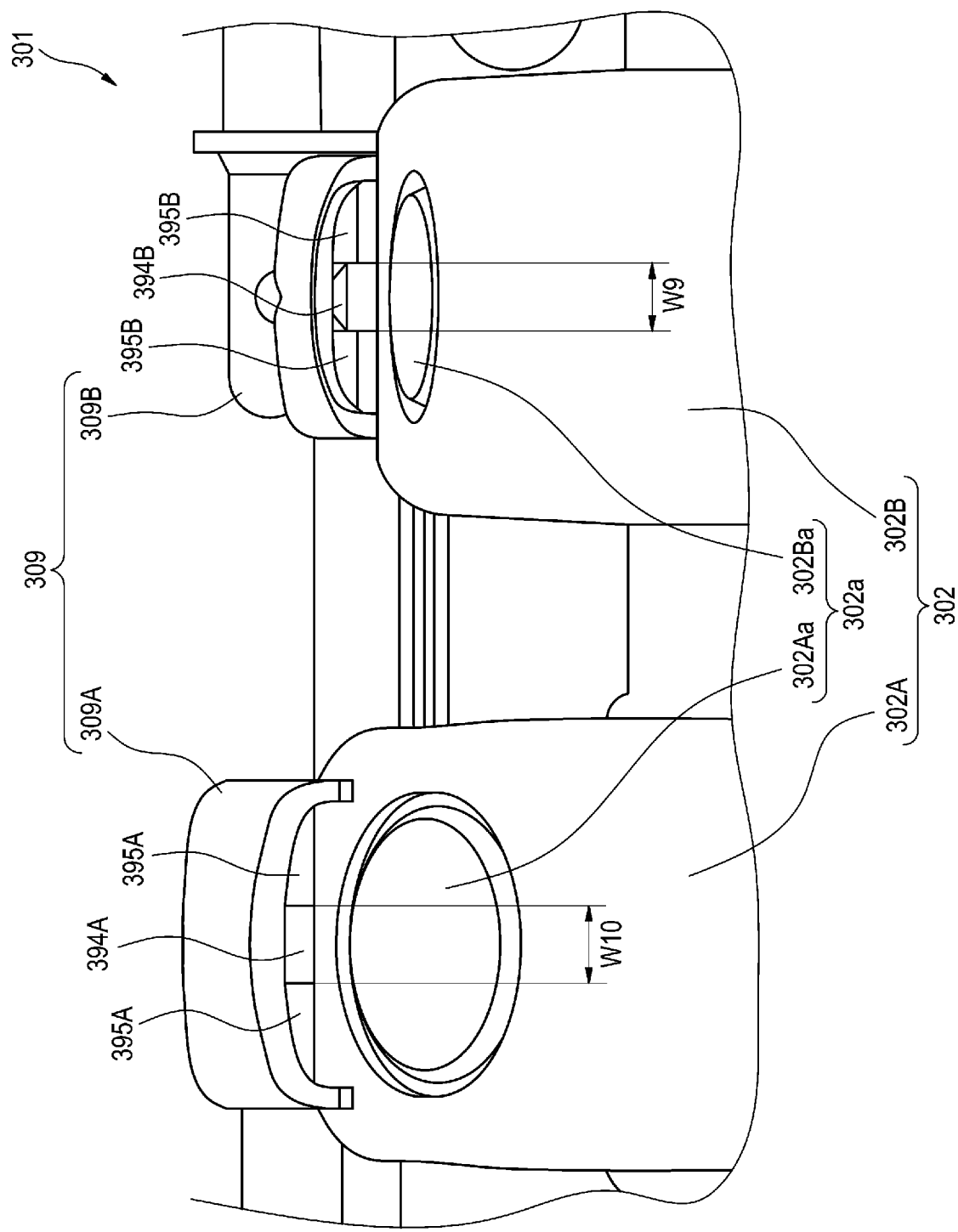
FIG. 18 illustrates an ejection port of the nozzle of FIG. 17.

Next, a vehicular cleaner unit 301 according to a third embodiment will be described with reference to the drawings. FIG. 17 illustrates an in-vehicle camera 302 and a nozzle 309 of the vehicular cleaner unit 301 according to the third embodiment. FIG. 18 illustrates an ejection port of the nozzle 309 illustrated in FIG. 17. In description of the third embodiment, members having the same reference numerals as those of the members already described in the description of the first embodiment will not be described for convenience of description.

According to the vehicular cleaner unit 301 of the third embodiment, a surface to be cleaned of a rear camera 302B and a surface to be cleaned of a back camera 302A have different sizes, while a back camera nozzle 309A and a rear camera nozzle 309B have different shapes, which is different from the first embodiment. In the present embodiment, the surfaces to be cleaned include lenses 302Aa and 302Ba, and the lens 302Ba is formed to be smaller than the lens 302Aa. In the vehicular cleaner unit 301, configurations other than the back camera 302A, the rear camera 302B, the back camera nozzle 309A, and the rear camera nozzle 309B are the same as those of the first embodiment, and description thereof is omitted for convenience of description.

As illustrated in FIG. 17, the back camera 302A includes the circular lens 302Aa. The rear camera 302B includes the circular lens 302Ba. The lens 302Ba of the rear camera 302B has a diameter smaller than a diameter of the lens 302Aa of the back camera 302A. That is, a width of the lens 302Ba of the rear camera 302B is formed to be smaller than a width of the lens 302Aa of the back camera 302A. The widths of the lens 302Ba and the lens 302Aa refer to widths in a direction orthogonal to an ejection direction of the cleaning liquid and the air (hereinafter, simply referred to as an ejection direction), and correspond to a lens diameter in the present embodiment.

The rear camera nozzle 309B is formed to have a shape corresponding to a shape of the lens 302Ba, which is smaller than that of the back camera nozzle 309A. For example, as illustrated in FIG. 17, a width W7 of the rear camera nozzle 309B in the direction orthogonal to the ejection direction is smaller than a width W8 of the lens 302Aa of the back camera 302A in the direction orthogonal to the ejection direction.

A cleaning liquid ejection port 394B of the rear camera nozzle 309B is formed such that a cleaning liquid ejection angle thereof is smaller than a cleaning liquid ejection angle of a cleaning liquid ejection port 394A of the back camera nozzle 309A. For example, as illustrated in FIG. 17, an angle θ3 is formed to be smaller than an angle θ4. The angle θ3 is a spreading angle from a tip end opening 398Ba of a cleaning liquid conveyance path of a cleaning liquid ejection path 399B of the rear camera nozzle 309B to the cleaning liquid ejection port 394B. The angle θ4 is a spreading angle from a tip end opening 398Aa of a cleaning liquid conveyance path of a cleaning liquid ejection path 399A of the back camera nozzle 309A to the cleaning liquid ejection port 394A. As illustrated in FIG. 18, a width W9 of the cleaning liquid ejection port 394B of the rear camera nozzle 309B may be formed to be smaller than a width W10 of the cleaning liquid ejection port 394A of the back camera nozzle 309A.

As illustrated in FIG. 18, the cleaning liquid ejection port 394B of the rear camera nozzle 309B is formed such that an area of a surface orthogonal to the cleaning liquid ejection direction thereof is smaller than an area of a surface orthogonal to the cleaning liquid ejection direction of the cleaning liquid ejection port 394A of the back camera nozzle 309A.

Air ejection ports 395B, 395B of the rear camera nozzle 309B are formed such that an area of a surface orthogonal to a cleaning liquid ejection direction thereof is smaller than an area of a surface orthogonal to an air ejection direction of air ejection ports 395A, 395A of the back camera nozzle 309A.

As described in the first embodiment, the back camera 302A and the rear camera 302B are attached to the bracket 5 so as to face different directions. That is, a distance between the air guide tube 8 and the lens 302Ba of the rear camera 302B is shorter than a distance between the air guide tube 8 and the lens 302Aa of the back camera 302A. Corresponding to such a structure, an ejection direction length of the rear camera nozzle 309B is formed to be smaller than an ejection direction length of the back camera nozzle 309A.

A surface to be cleaned is a lens 302a of the in-vehicle camera 302. However, for example, the surface to be cleaned may also be a region including the lens 302a of the in-vehicle camera 302 and a periphery thereof.

As an example in which a shape of the rear camera nozzle 309B is smaller than a shape of the back camera nozzle 309A, a width and a length of the rear camera nozzle 309B are smaller than a width and a length of the back camera nozzle 309A. The cleaning liquid ejection angle of the cleaning liquid spray port 394B of the rear camera nozzle 309B is smaller than the cleaning liquid ejection angle of the back camera nozzle 309A. Areas of the cleaning liquid ejection port 394B and the air ejection ports 395B, 395B of the rear camera nozzle 309B are smaller than areas of the cleaning liquid ejection port 394A and the air ejection ports 395A, 395A of the back camera nozzle 309A. However, a configuration in which at least one of such areas is smaller than that of the back camera nozzle 309A may also be adopted.

For example, the area of any one of the cleaning liquid ejection port 394B and the air ejection ports 395B, 395B of the rear camera nozzle 309B may be smaller than the area of the cleaning liquid ejection port 394A or the air ejection ports 395A, 395A of the corresponding back camera nozzle 309A.

As described above, in the above-described embodiment, the back camera nozzle 309A and the rear camera nozzle 309B have different shapes in accordance with sizes of the back camera 302A and the rear camera 302B whose surfaces to be cleaned (for example, the lenses 302Aa and 302Ba) have different sizes. Therefore, the back camera 302A and the rear camera 302B whose surfaces to be cleaned have different sizes can be efficiently cleaned.

For example, the back camera nozzle 309A and the rear camera nozzle 309B have different widths in the direction orthogonal to the ejection direction. Therefore, the back camera 302A and the rear camera 302B whose surfaces to be cleaned have different widths can be efficiently cleaned.

The back camera nozzle 309A and the rear camera nozzle 309B have different lengths in the ejection direction. Therefore, the back camera 302A and the rear camera 302B whose surfaces to be cleaned have different positions and angles can be efficiently cleaned.

The back camera nozzle 309A and the rear camera nozzle 309B have different cleaning liquid ejection angles. Therefore, the back camera 302A and the rear camera 302B whose surfaces to be cleaned have different sizes can be efficiently cleaned with different cleaning liquid ejection angles.

The back camera nozzle 309A and the rear camera nozzle 309B are different from each other in the area of the surface orthogonal to the ejection direction of the cleaning liquid ejection port 394 and/or the air ejection ports 395, 395. Therefore, the back camera 302A and the rear camera 302B whose surfaces to be cleaned have different sizes can be efficiently cleaned with different cleaning liquid ejection angles and/or different air ejection amounts.

The plurality of cleaning objects refer to the back camera 302A and the rear camera 302B. The vehicular cleaner unit 301 can efficiently clean the back camera 302A and the rear camera 302B. For example, the cleaning surface of the rear camera 302B is smaller than that of the back camera 302A. Therefore, the back camera 302A and the rear camera 302B can be efficiently cleaned by making a size (a width and/or a length, an ejection port shape, and the like) of the rear camera nozzle 309B smaller than a size of the back camera nozzle 309A.

Such a shape of the nozzle 9 can also be applied to a nozzle which only ejects air or a nozzle which only ejects cleaning liquid. Even in the case of the nozzle which only ejects air or the nozzle which only ejects cleaning liquid, the same effects as those described above can still be obtained.

The present embodiment is applicable to both the first embodiment and the second embodiment.

Modification of Multi-Blade Fan

Although the multi-blade fan provided with the vibration-proof portion which includes the elastic member, the elastic member attachment portion, and the cage portion is described in the first to third embodiments, the vibration-proof portion is not limited to have such a configuration. For example, the vibration-proof portion may also be configured by a leaf spring or the like. Hereinafter, a modification of a multi-blade fan using a leaf spring will be described with reference to the drawings.

Figure 19:
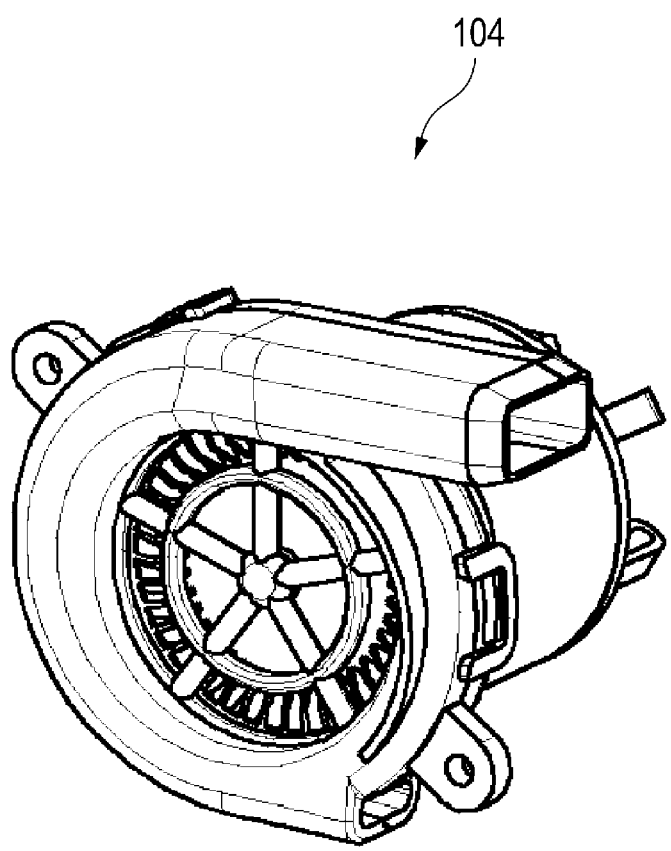
FIG. 19 is a perspective view of a multi-blade fan of a modification.
Figure 20:
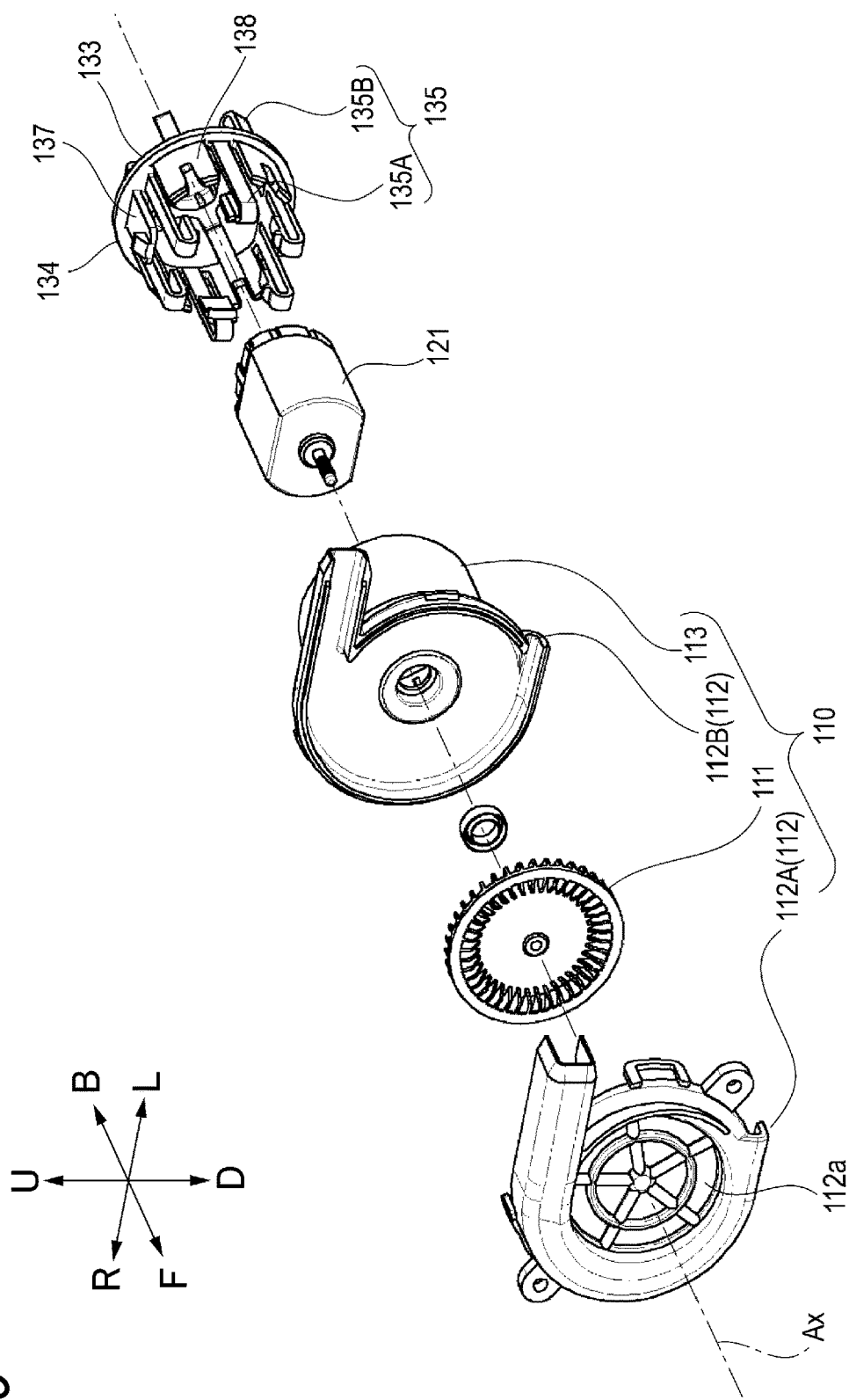
FIG. 20 is an exploded perspective view of the multi-blade fan of the modification.
Figure 21:
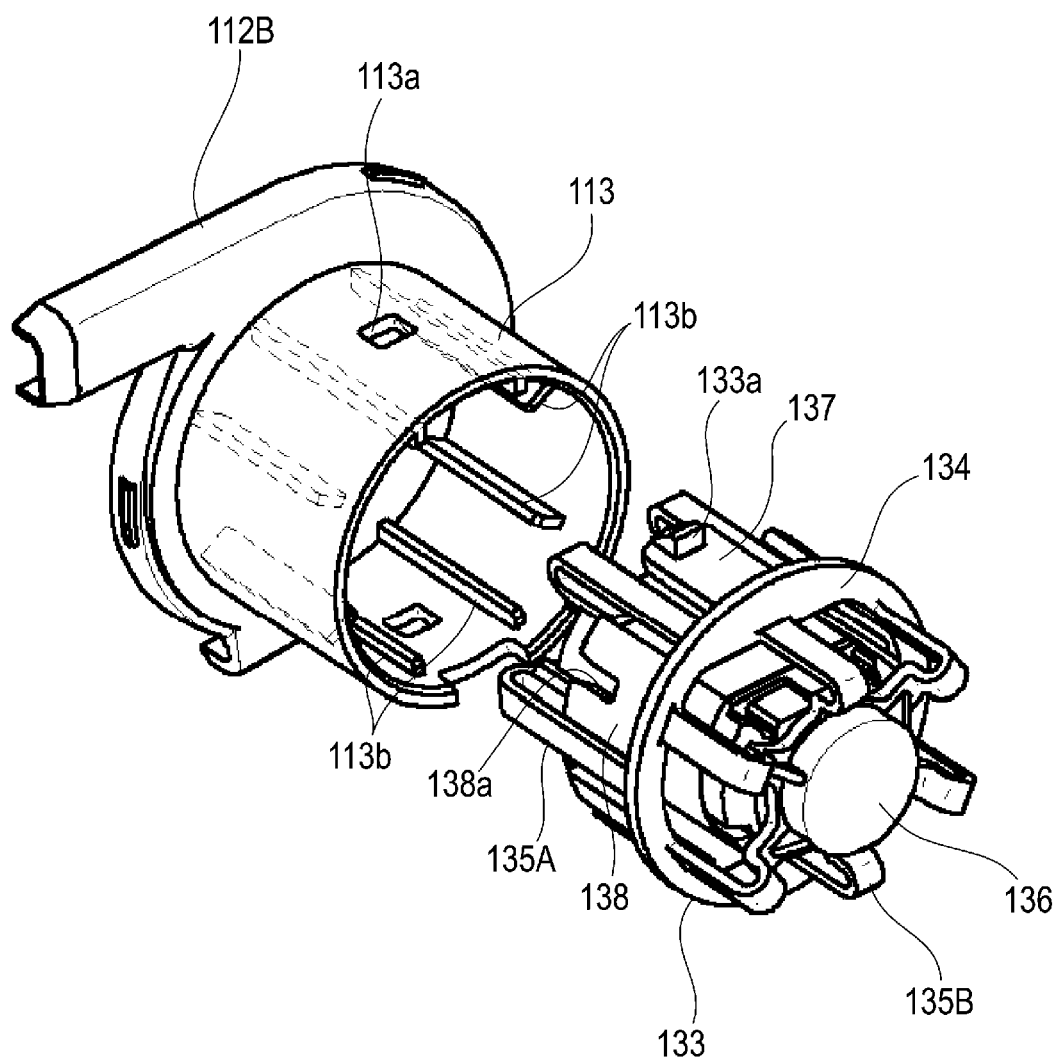
FIG. 21 illustrates a connection relationship between a support portion and a cage portion of the multi-blade fan of the modification.
Figure 22A:
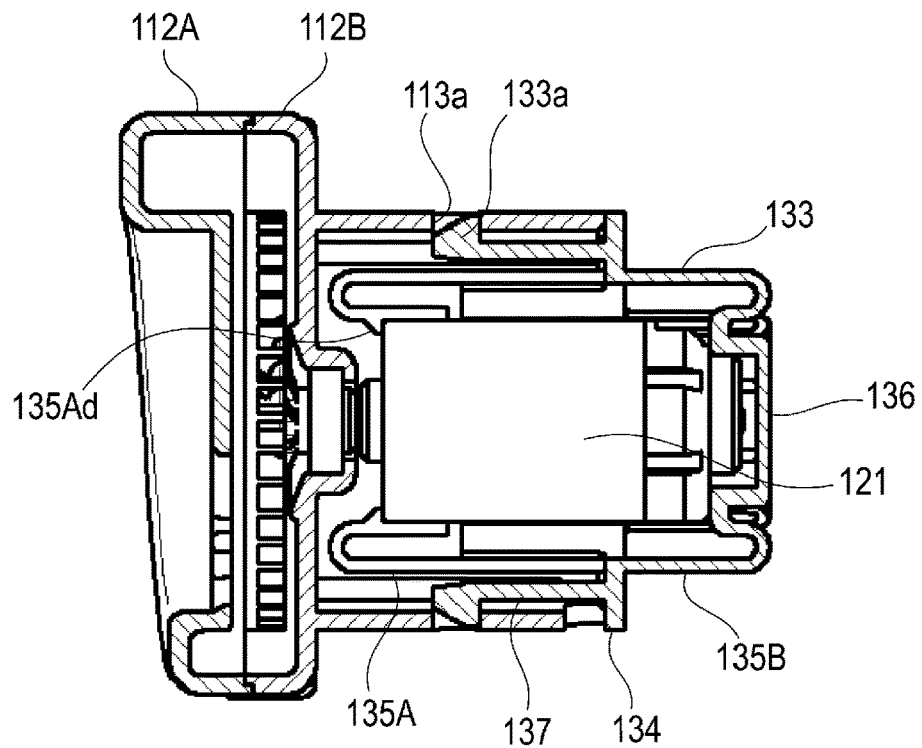
FIG. 22A is an axial direction cross-sectional view of the multi-blade fan of the modification.
Figure 22B:
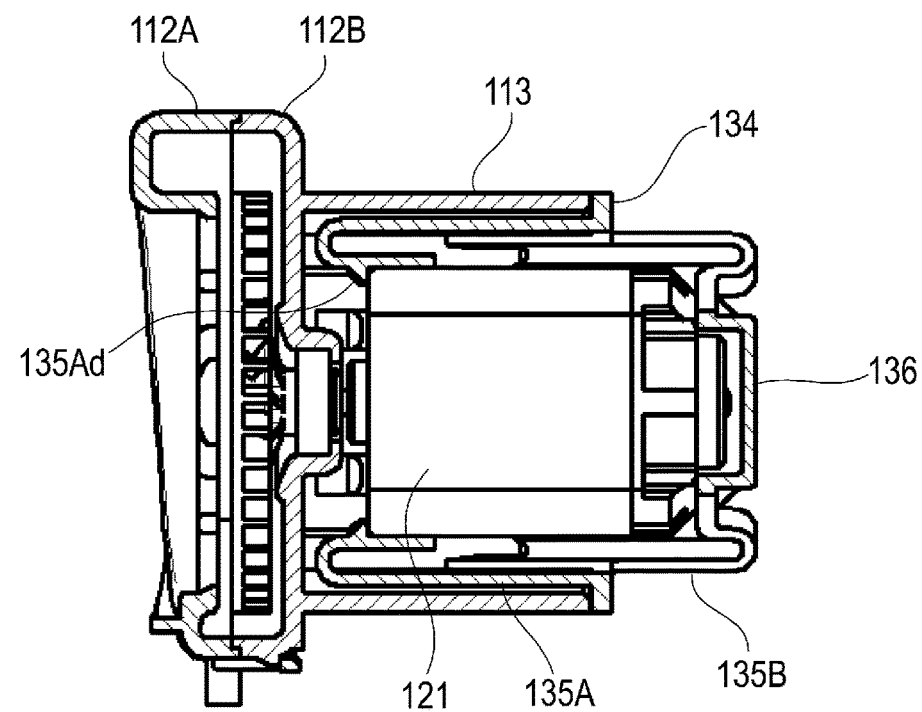
FIG. 22B is an axial direction cross-sectional view of the multi-blade fan of the modification.
Figure 23A:
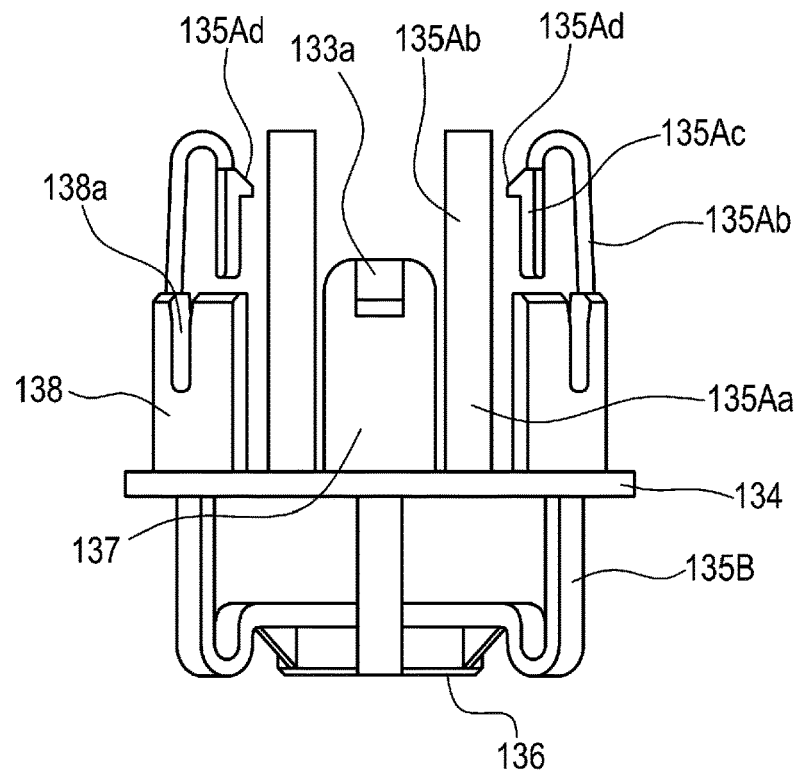
FIG. 23A illustrates the cage portion of the multi-blade fan of the modification.
Figure 23B:
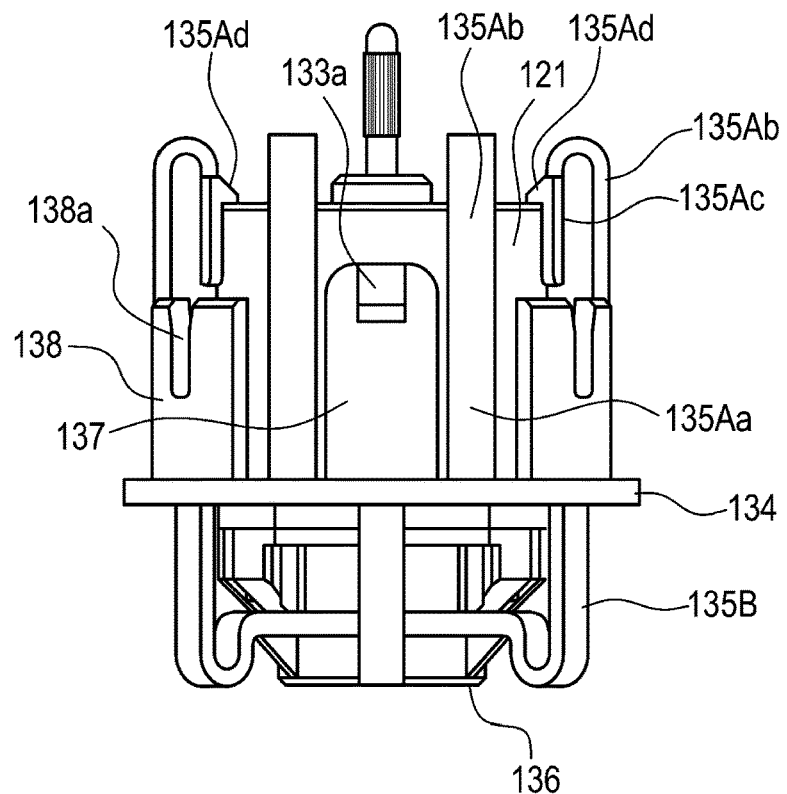
FIG. 23B illustrates a state in which the cage portion is attached to a motor of the multi-blade fan of the modification.

FIG. 19 is a perspective view of a multi-blade fan 104 according of the modification. FIG. 20 is an exploded perspective view of the multi-blade fan 104 of the modification. FIG. 21 illustrates a connection relationship between a support portion 113 and a cage portion 133 of the multi-blade fan 104 of the modification. FIG. 22A is an axial direction cross-sectional view of the multi-blade fan 104 of the modification. FIG. 22B is the axial direction cross-sectional view of the multi-blade fan 104 of the modification. FIG. 22A is a cross-sectional view of a portion including a support portion attachment portion 137 (hereinafter, referred to as an attachment portion 137) of the cage portion 133 taken along the rotation axis Ax. FIG. 22B is a cross-sectional view of a portion including a first leaf spring 135A of the cage portion 133 taken along the rotation axis Ax. In FIGS. 22A and 22B, only a housing 112 and the cage portion 133 are illustrated in cross sections. FIG. 23A illustrates the cage portion 133 of the multi-blade fan 104 of the modification. FIG. 23B illustrates a state in which the cage portion 133 is attached to a motor 121 of the multi-blade fan 104 of the modification. In description of the multi-blade fan 104, description of members already described in the description of the multi-blade fan 4 of the first embodiment will be omitted for convenience of description.

As illustrated in FIGS. 19 and 20, the multi-blade fan 104 includes a multi-blade fan body portion 110, the motor 121, and the cage portion 133. The multi-blade fan 104 is an example of an air blowing portion. The multi-blade fan body portion 110 is an example of an air blowing portion body. The motor 121 is an example of a driving portion.

The multi-blade fan body portion 110 includes an impeller 111, the housing 112, and the support portion 113. The impeller 111 is rotated around the rotation axis Ax by the motor 121 so as to suction air from an air intake port 112a. The housing 112 accommodates the impeller 111 in a substantially doughnut-shaped internal space formed by a front housing 112A and a rear housing 112B.

The support portion 113 supports the housing 112. As illustrated in FIG. 21, the support portion 113 has a cylindrical shape extending rearward from a rear surface of the rear housing 112B along the rotation axis Ax. In the present embodiment, the support portion 113 is integrally molded with the housing 112. The support portion 113 accommodates the motor 121 therein. As illustrated in FIGS. 21 and 22A, the support portion 113 includes an engagement hole 113a, and is connected to the cage portion 133 by engaging an engagement claw 133a of the cage portion 133 with the engagement hole 113a. As illustrated in FIG. 21, the support portion 113 includes a plurality of plate-like ribs 113b extending along the rotation axis Ax on an inner surface thereof. Among the plurality of ribs 113b, some of the ribs 113b guide a rotation prevention portion 138 of the cage portion 133 and lock the rotation prevention portion 138. When the cage portion 133 is attached to the support portion 113, the attachment portion 137 of the cage portion 133 and the first leaf spring 135A are guided between the adjacent ribs 113b. The ribs 113b which lock the rotation prevention portion 138 is formed to be shorter than lengths of the other ribs 113b by an amount corresponding to the rotation prevention portion 138.

The support portion 113 has a cylindrical shape and is integrally molded with the housing 112. However, for example, the support portion 113 may also be formed separately from the housing 112, and may be integrated with the housing 112 by being assembled to or bonded to the housing 112. The support portion 113 may have a tubular shape whose cross section is an elliptical or polygonal.

A configuration of the multi-blade fan body portion 110 other than the support portion 113 is the same as the configuration of the multi-blade fan body portion 110 of the first embodiment, and description thereof is omitted for convenience of description.

The cage portion 133 absorbs vibration of the motor 121 while supporting the motor 121, and prevents the vibration of the motor 121 from being transmitted to the support portion 113. The cage portion 133 is provided to cover a side surface and a rear surface of the motor 121. The cage portion 133 includes a flange portion 134, a leaf spring portion 135, a bottom portion 136, the attachment portion 137, and the rotation prevention portion 138. The cage portion 133 is made of metal, while the flange portion 134, the leaf spring portion 135, the bottom portion 136, the attachment portion 137, and the rotation prevention portion 138 are integrally molded.

The flange portion 134 is in contact with the support portion 113. The flange portion 134 has a ring shape extending radially outward of the motor 121.

The leaf spring portion 135 is in contact with the motor 121 and absorbs the vibration of the motor 121. The leaf spring portion 135 includes a plurality of the first leaf springs 135A and a plurality of second leaf springs 135B.

Each first leaf spring 135A extends forward from the flange portion 134, and a tip end portion thereof is bent inward. In the present embodiment, six first leaf springs 135A are arranged at equal intervals in a peripheral direction of the flange portion 134. As illustrated in FIG. 23A, the first leaf spring 135A includes a linear portion 135Aa, a flexible portion 135Ab, and a contact portion 135Ac. The linear portion 135Aa extends from the flange portion 134 along the rotation axis Ax. The flexible portion 135Ab extends from the linear portion 135Aa while being inclined inward relative to the rotation axis Ax. The contact portion 135Ac is provided at a tip end portion bent inward from the flexible portion 135Ab, and is in contact with the motor 121. The contact portion 135Ac extends in an axial direction of the motor 121 and is contact with the side surface of the motor 121. As illustrated in FIG. 22B and FIG. 23B, the contact portion 135Ac includes a protruding portion 135Ad which protrudes inward in a radial direction of the motor 121, and is in contact with the front surface of the motor 121. The contact portion 135Ac may not include the protruding portion 135Ad.

As illustrated in FIG. 23B, in a state in which the motor 121 is accommodated in the cage portion 133, the flange portion 134 and the flexible portion 135Ab of the first leaf spring 135A extend along a longitudinal direction of the motor 121 in a state in which the flange portion 134 and the flexible portion 135Ab are not in contact with the motor 121, and the contact portion 135Ac is in contact with a front end portion of the motor 121. Since the contact portion 135Ac is in contact with the motor 121, the flexible portion 135Ab is deformed so as to extend parallel to the rotation axis Ax. As a result, a deformation spring force is always generated in the first leaf spring 135A.

The second leaf spring 135B extends rearward from the flange portion 134 along the rotation axis Ax. A rear end portion of the second leaf spring 135B is bent inward so as to be recessed rearward and is connected to the bottom portion 136. As illustrated in FIG. 22A, a portion, which is connected to the bottom portion 136, of the second leaf spring 135B is in contact with a rear end portion of the motor 121, and absorbs the vibration of the motor 121. In the present embodiment, six second leaf springs 135B are arranged at equal intervals in the peripheral direction of the flange portion 134.

The leaf spring portion 135 includes the first leaf spring 135A and the second leaf spring 135B. However, the leaf spring portion 135 may include only one of the first leaf spring 135A and the second leaf spring 135B. Shapes and numbers of the first leaf springs 135A and the second leaf springs 135B are also not limited to shapes and numbers of the present embodiment.

The bottom portion 136 is recessed rearward and accommodates the rear end portion of the motor 121.

The attachment portion 137 is engaged with the support portion 113 so as to attach the cage portion 133 to the support portion 113. The attachment portion 137 extends forward from the flange portion 134 along the rotation axis Ax. The attachment portion 137 includes the engagement claw 133a at a front end portion thereof. The engagement claw 133a is engaged with the engagement hole 113a of the support portion 113. In the present embodiment, two attachment portions 137 are arranged at positions facing each other in the peripheral direction of the flange portion 134. The attachment portion 137 is arranged radially outward relative to the first leaf spring 135A.

The rotation prevention portion 138 prevents rotation of the cage portion 133 relative to the support portion 113. The rotation prevention portion 138 extends forward from the flange portion 134 along the rotation axis Ax. The rotation prevention portion 138 includes a notch portion 138a at a front end portion thereof. The notch portion 138a is guided and locked by each rib 113b of the support portion 113. In the present embodiment, rotation prevention portions 138 are arranged at four positions in the peripheral direction of the flange portion 134. The rotation prevention portion 138 is arranged radially outward relative to the first leaf spring 135A.

As described above, in the above-described modification, the cage portion 133 which functions as a vibration-proof portion prevents the vibration of the motor 121 from being transmitted to the support portion 113. Therefore, the vibration of the motor 121 can be prevented from being transmitted to the multi-blade fan body portion 110 of the multi-blade fan 104 via the support portion 113. Generation of vibration noise caused by the vibration of the motor 121 can also be prevented.

The cage portion 133 supports the motor 121 and is connected to the support portion 113. The cage portion 133 includes the leaf spring portion 135 which absorbs the vibration of the motor 121. Therefore, since the vibration of the motor 121 is absorbed by the leaf spring portion 135, the vibration of the motor 121 can be prevented from being transmitted to the support portion 113 while the motor 121 is supported by the cage portion 133.

The leaf spring portion 135 includes the first leaf spring 135A which is in contact with a front portion of the motor 121 and the second leaf spring 135B which is in contact with a rear portion of the motor 121. Therefore, the vibration of the motor 121 can be further prevented from being transmitted to the support portion 113.

The cage portion 133 includes the flange portion 134 which is in contact with the support portion 113. The first leaf spring 135A extends from the flange portion 134 along the motor 121 in a state of not being in contact with the motor 121, and is in contact with the motor 121 at the contact portion 135Ac. The first leaf spring 135A absorbs the vibration of the motor 121 transmitted from the contact portion 135Ac, so that the vibration can be prevented from being transmitted to the flange portion 134.

The cage portion 133 includes the rotation prevention portion 138 which is locked to the support portion 113 and prevents the rotation of the cage portion 133 relative to the support portion 113. Therefore, the rotation prevention portion 138 can prevent the cage portion 133 from being rotated relative to the support portion 113 due to the vibration of the motor 121.

Although the embodiments of the present disclosure have been described above, it is needless to say that the technical scope of the present disclosure should not be construed as being limited by the description of the embodiments. It is to be understood by those skilled in the art that the present embodiments are merely examples and various modifications may be made within the scope of the invention described in the claims. The technical scope of the present disclosure should be determined based on the scope of the invention described in the claims and the scope of equivalents thereof.

In the above embodiments, an example in which the vehicular cleaner unit is provided at the rear portion of the vehicle V has been described. However, the vehicular cleaner unit may also be provided at a front portion of the vehicle V or a side portion of the vehicle V.

In the above-described embodiments, an example in which the cleaning objects are the back cameras 2A and 302A and the rear cameras 2B and 302B has been described. However, for example, the cleaning object may be any one of the back cameras 2A and 302A and the rear cameras 2B and 302B, or may be a camera used for other purposes. The cleaning object may also be a sensor different from the camera, such as light detection and ranging or laser imaging detection and ranging (LiDAR).

In the above embodiments, the air guide tube 8 conveys different amounts of air to the back cameras 2A and 302A and the rear cameras 2B and 302B, which serve as the cleaning objects. However, for example, the air guide tube 8 may also convey the same amount of air to the back cameras 2A and 302A and the rear cameras 2B and 302B which serve as the cleaning objects by changing positions of the partition plate 71a and the like.

Further, in the above-described embodiments, the vehicular cleaners 3 and 203 include the non-displacement type multi-blade fans 4 and 104 which continuously send out the air as the air blowing portion. However, the vehicular cleaners 3 and 203 may include an axial flow fan or a mixed flow fan which serves as a non-displacement air blowing unit. In this case, it is necessary to change a position of the air intake port 12a of the bracket 5 in accordance with an intake port of the axial flow fan or the mixed flow fan. The vehicular cleaners 3 and 203 may also include a compressed air generation portion which serves as the air blowing portion and sends compressed air.

The present application is based on Japanese Patent Application No. 2019-17121 filed on Feb. 1, 2019, Japanese Patent Application No. 2019-17122 filed on Feb. 1, 2019, and Japanese Patent Application No. 2019-17123 filed on Feb. 1, 2019, the contents of which are incorporated herein by reference.

The invention claimed is:

1. A vehicular cleaner comprising: an air blowing portion including an air blowing portion body which sends air to be ejected to a cleaning object, and includes an impeller and a housing comprising a front housing and a rear housing which are divided into two parts with the impeller interposed therebetween, a supporting portion which extends rearward from a rear surface of the housing along a rotation axis and supports at least the air blowing portion body, and a driving portion which includes a motor and drives the air blowing portion body; and a vibration-proof portion which surrounds and contacts the motor, connects the supporting portion with the motor, and prevents a vibration of the driving portion from being transmitted to the supporting portion.

2. The vehicle cleaner according to claim 1,
wherein the vibration-proof portion includes an elastic member which absorbs the vibration of the driving portion and an attachment portion which attaches the elastic member to the driving portion, and
wherein the supporting portion is attached to the elastic member so as not to be in contact with the driving portion.

3. The vehicle cleaner according to claim 2,
wherein the attachment portion has a bar shape,
wherein the elastic member has a tubular shape having a through hole,
wherein a groove recessed in a direction orthogonal to an axial direction of the through hole is formed in a side surface of the elastic member, and
wherein the attachment portion is inserted into the through hole, and a part of the supporting portion is inserted into the groove.

4. The vehicle cleaner according to claim 3,
wherein the vibration-proof portion further includes a cage portion which surrounds the driving portion in a state where the vibration-proof portion is in contact with the driving portion, and
wherein the attachment portion is integrally molded with the cage portion.

5. The vehicle cleaner according to claim 3,
wherein the vibration-proof portion includes at least three attachment portions arranged around the driving portion, and at least three elastic members attached to the driving portion via the three attachment portions.

6. The vehicle cleaner according to claim 1,
wherein the vibration-proof portion includes a cage portion which supports the driving portion and is connected to the supporting portion, and
wherein the cage portion includes a leaf spring portion which absorbs the vibration of the driving portion.

7. The vehicle cleaner according to claim 6,
wherein the cage portion includes a flange portion which is in contact with the supporting portion, and
wherein the leaf spring portion extends from the flange portion along the driving portion in a state where the leaf spring portion is not in contact with the driving portion, and a tip end portion of the leaf spring portion is in contact with the driving portion.

8. The vehicle cleaner according to claim 6,
wherein the cage portion includes a rotation prevention portion which is locked to the supporting portion and prevents a rotation of the cage portion relative to the supporting portion.

* * * * *